(12) United States Patent
Terayama

(10) Patent No.: US 7,773,301 B2
(45) Date of Patent: Aug. 10, 2010

(54) ANTIREFLECTION FILM

(75) Inventor: Etsuo Terayama, Saitama (JP)

(73) Assignee: Fujinon Corporation, Saitama (JP)

( * ) Notice: Subject to any disclaimer, the term of this patent is extended or adjusted under 35 U.S.C. 154(b) by 647 days.

(21) Appl. No.: 11/652,021

(22) Filed: Jan. 11, 2007

(65) Prior Publication Data
US 2007/0159697 A1 Jul. 12, 2007

(30) Foreign Application Priority Data

| Jan. 12, 2006 | (JP) | ............................ P2006-005133 |
| Dec. 22, 2006 | (JP) | ............................ P2006-345552 |

(51) Int. Cl.
*G02B 1/10* (2006.01)
(52) U.S. Cl. .................... 359/588; 359/586; 359/589
(58) Field of Classification Search ................ 359/586, 359/588, 589
See application file for complete search history.

(56) References Cited

U.S. PATENT DOCUMENTS

| 4,726,654 | A  | 2/1988 | Kimura et al. |
| 2005/0122576 | A1 | 6/2005 | Yonetani et al. |
| 2005/0201422 | A1 | 9/2005 | Ohta et al. |

FOREIGN PATENT DOCUMENTS

| JP | 2001-100002 A | 4/2001 |
| JP | 2002-107506 A | 4/2002 |
| JP | 2002-267801 A | 9/2002 |

OTHER PUBLICATIONS

Liou, Japanese Journal of Applied Physics, "Designing a Broadband Visible Antireflection Coating by Flip-Flop Tuning Search Technique," vol. 42, No. 11, pp. 6879-6882, (Nov. 10, 2003) XP002428367.
Tikhonravov et al., Applied Optics, "Application of the Needle Optimization Technique to the Design of Optical Coatings," vol. 35, No. 28, pp. 5493-5508, (Oct. 1, 1996) XP009053835.
"What's new in Optilayer in 2008 (major updates, version 7.21)", Optilayer Thin Film Software, retrieved from the Internet on Jun. 8, 2009: http://www.optilayer.com/whats_new.htm>.
Office Action, dated Jun. 15, 2009, for corresponding European Application No. 07000445.2.

*Primary Examiner*—Joshua L Pritchett
(74) *Attorney, Agent, or Firm*—Birch, Stewart, Kolasch & Birch, LLP

(57) ABSTRACT

An antireflection film is disposed on a surface of an optical substrate, and consists of first to tenth layers to stacked sequentially from the opposite side to the optical substrate. The first layer, the fourth layer and the ninth layer are low-refractive index layers made of a low-refractive index material exhibiting a refractive index of 1.35 to 1.50 with respect to the d-line. The third layer, the fifth layer, the seventh layer and the tenth layer are intermediate-refractive index layers made of an intermediate-refractive index material exhibiting a refractive index of 1.55 to 1.85 with respect to the d-line.

The second layer, the sixth layer and the eighth layer are high-refractive index layers made of a high-refractive index material exhibiting a refractive index that is in a range from 1.70 to 2.50 with respect to the d-line, and that is higher than the refractive index of the intermediate-refractive index material.

33 Claims, 36 Drawing Sheets

FIG. 9A EXAMPLE 1-1
CENTER WAVELENGTH λ0=480nm
|  | MATERIAL | N | d | N·d | |
|---|---|---|---|---|---|
| AIR | — | — | — | — | |
| 1st LAYER (L1) | MgF$_2$ | 1.3855 | 90.124 | 124.867 | (0.260 λ0) |
| 2nd LAYER (H) | sub-h4 | 2.0928 | 111.632 | 233.623 | (0.487 λ0) |
| 3rd LAYER (M) | Al$_2$O$_3$ | 1.6289 | 60.370 | 98.337 | (0.205 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 83.314 | 135.710 | (0.283 λ0) |
| 6th LAYER (H) | sub-h4 | 2.0928 | 93.955 | 196.629 | (0.410 λ0) |
| 7th LAYER (M) | Al$_2$O$_3$ | 1.6289 | 10.500 | 17.103 | (0.036 λ0) |
| 8th LAYER (H) | sub-h4 | 2.0928 | 23.371 | 48.911 | (0.102 λ0) |
| 9th LAYER (L2) | SiO$_2$ | 1.4671 | 28.000 | 41.079 | (0.086 λ0) |
| 10th LAYER (M) | Al$_2$O$_3$ | 1.6289 | 41.143 | 67.018 | (0.140 λ0) |
| OPTICAL SUBSTRATE | CaF$_2$ | 1.4339 | — | — | |
FIG. 9B EXAMPLE 1-1
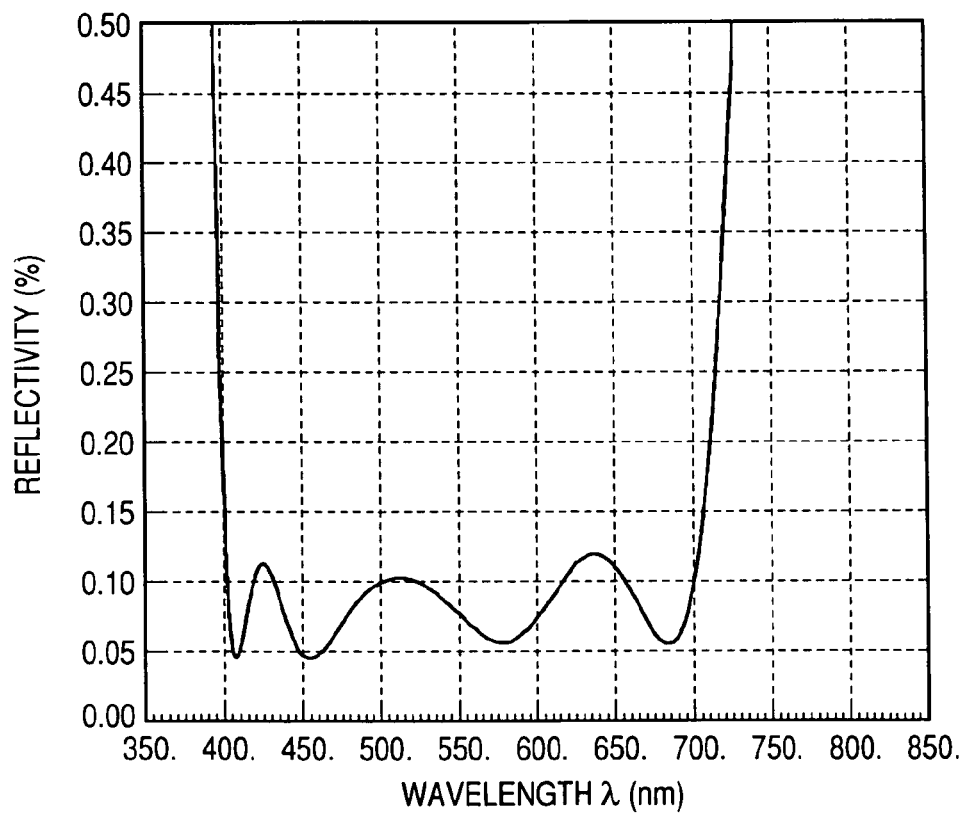

FIG. 10A EXAMPLE 1-2
CENTER WAVELENGTH λ0=480nm
|  | MATERIAL | N | d | N·d | |
|---|---|---|---|---|---|
| AIR | — | — | 0 | — | |
| 1st LAYER (L1) | MgF2 | 1.3855 | 89.650 | 124.210 | (0.259 λ0) |
| 2nd LAYER (H) | sub-h4 | 2.0928 | 111.366 | 233.067 | (0.486 λ0) |
| 3rd LAYER (M) | Al2O3 | 1.6289 | 62.274 | 101.438 | (0.211 λ0) |
| 4th LAYER (L1) | MgF2 | 1.3855 | 28.000 | 38.794 | (0.081 λ0) |
| 5th LAYER (M) | Al2O3 | 1.6289 | 81.614 | 132.941 | (0.277 λ0) |
| 6th LAYER (H) | sub-h4 | 2.0928 | 108.340 | 226.734 | (0.472 λ0) |
| 7th LAYER (M) | Al2O3 | 1.6289 | 20.597 | 33.550 | (0.070 λ0) |
| 8th LAYER (H) | sub-h4 | 2.0928 | 14.586 | 30.526 | (0.064 λ0) |
| 9th LAYER (L2) | SiO2 | 1.4671 | 28.000 | 41.079 | (0.086 λ0) |
| 10th LAYER (M) | Al2O3 | 1.6289 | 33.680 | 54.861 | (0.114 λ0) |
| OPTICAL SUBSTRATE | SiO2 | 1.4585 | — | — | — |
FIG. 10B EXAMPLE 1-2
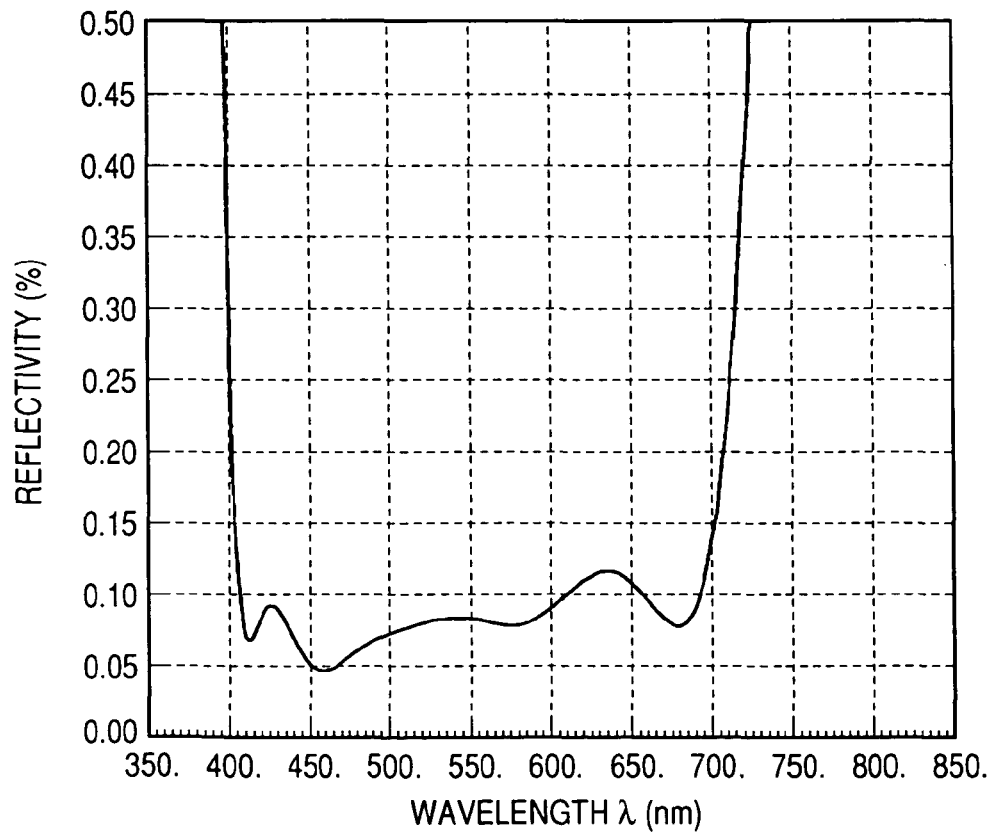

FIG. 11A EXAMPLE 2-1
CENTER WAVELENGTH λ0=480nm
|  | MATERIAL | N | d | N·d | |
|---|---|---|---|---|---|
| AIR | — | — | — | — | |
| 1st LAYER (L1) | MgF$_2$ | 1.3855 | 90.021 | 124.724 | (0.260 λ0) |
| 2nd LAYER (H) | sub-h4 | 2.0928 | 111.699 | 233.764 | (0.487 λ0) |
| 3rd LAYER (M) | Al$_2$O$_3$ | 1.6289 | 63.562 | 103.536 | (0.216 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 81.562 | 132.856 | (0.277 λ0) |
| 6th LAYER (H) | sub-h4 | 2.0928 | 98.796 | 206.760 | (0.431 λ0) |
| 7th LAYER (M) | Al$_2$O$_3$ | 1.6289 | 10.500 | 17.103 | (0.036 λ0) |
| 8th LAYER (H) | sub-h4 | 2.0928 | 20.981 | 43.909 | (0.091 λ0) |
| 9th LAYER (L2) | SiO$_2$ | 1.4671 | 38.223 | 56.077 | (0.117 λ0) |
| 10th LAYER (H) | Y$_2$O$_3$ | 1.8065 | 19.303 | 34.871 | (0.073 λ0) |
| OPTICAL SUBSTRATE | CaF$_2$ | 1.4339 | — | — | — |
FIG. 11B EXAMPLE 2-1
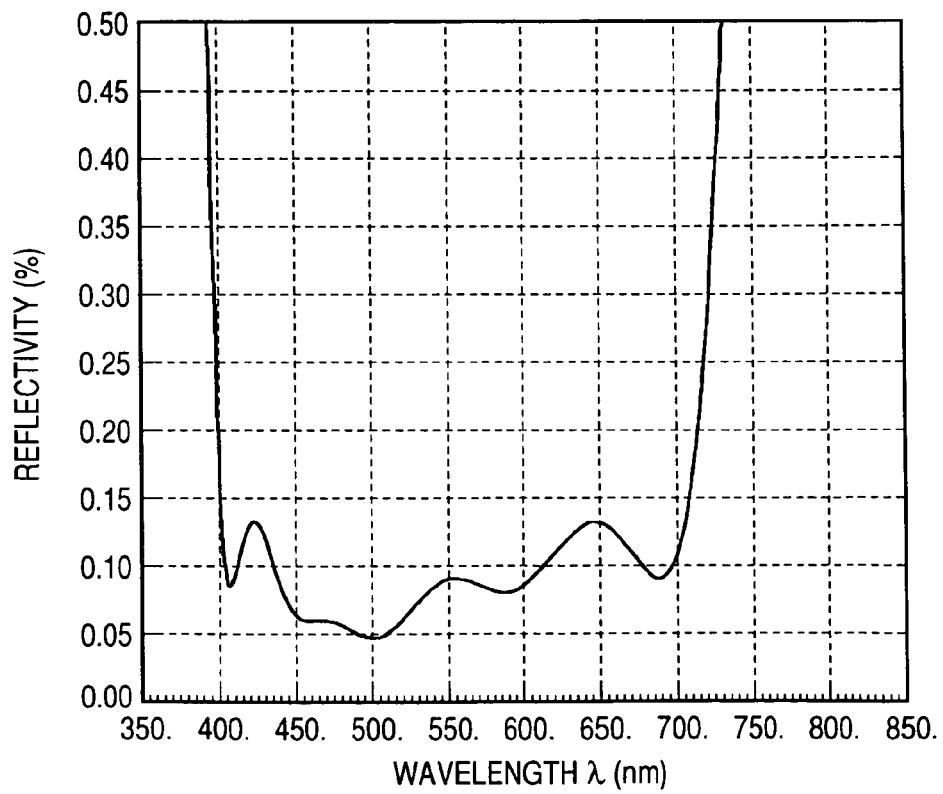

FIG. 12A EXAMPLE 2-2

CENTER WAVELENGTH $\lambda 0$=480nm

|  | MATERIAL | N | d | N·d | |
|---|---|---|---|---|---|
| AIR | — | — | — | — | |
| 1st LAYER (L1) | MgF$_2$ | 1.3855 | 90.060 | 124.778 | (0.260 $\lambda$0) |
| 2nd LAYER (H) | sub-h4 | 2.0928 | 111.604 | 233.565 | (0.487 $\lambda$0) |
| 3rd LAYER (M) | Al$_2$O$_3$ | 1.6289 | 64.104 | 104.419 | (0.218 $\lambda$0) |
| 4th LAYER (L1) | MgF$_2$ | 1.3855 | 28.000 | 38.794 | (0.081 $\lambda$0) |
| 5th LAYER (M) | Al$_2$O$_3$ | 1.6289 | 81.476 | 132.716 | (0.276 $\lambda$0) |
| 6th LAYER (H) | sub-h4 | 2.0928 | 101.622 | 212.675 | (0.443 $\lambda$0) |
| 7th LAYER (M) | Al$_2$O$_3$ | 1.6289 | 10.500 | 17.103 | (0.036 $\lambda$0) |
| 8th LAYER (H) | sub-h4 | 2.0928 | 19.423 | 40.648 | (0.085 $\lambda$0) |
| 9th LAYER (L2) | SiO$_2$ | 1.4671 | 34.099 | 50.027 | (0.104 $\lambda$0) |
| 10th LAYER (H) | Y$_2$O$_3$ | 1.8065 | 20.925 | 37.801 | (0.079 $\lambda$0) |
| OPTICAL SUBSTRATE | SiO$_2$ | 1.4585 | — | — | |

FIG. 12B EXAMPLE 2-2

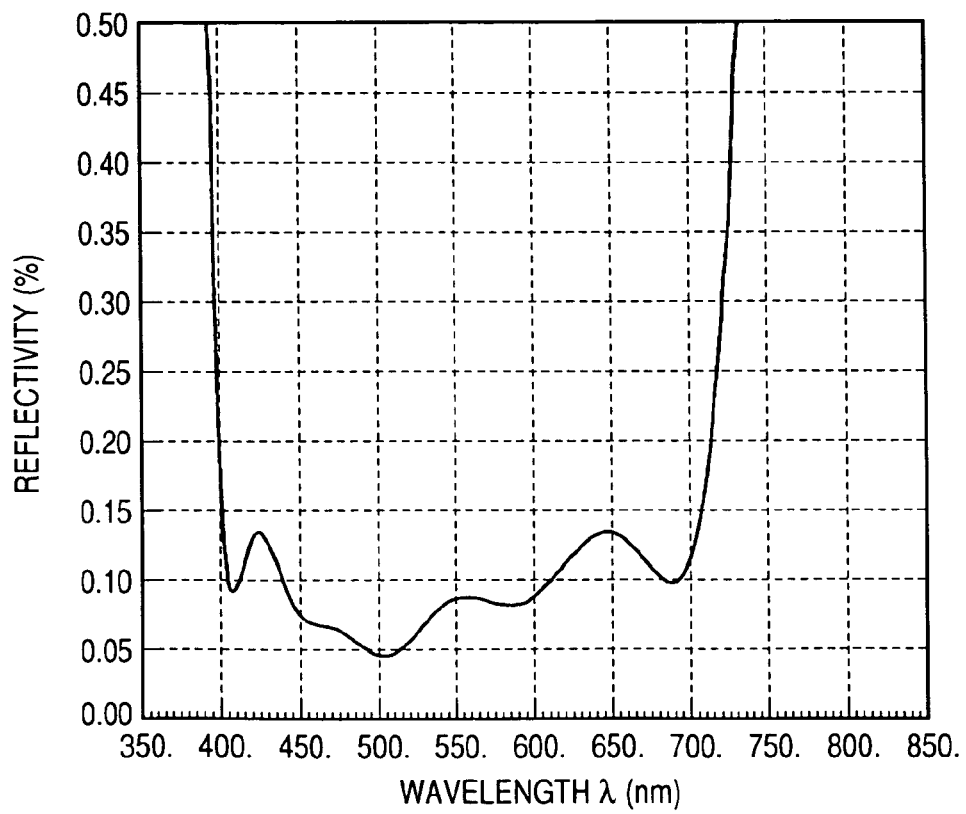

FIG. 13A EXAMPLE 2-3
CENTER WAVELENGTH λ0=480nm
|  | MATERIAL | N | d | N·d |  |
|---|---|---|---|---|---|
| AIR | — | — | — | — |  |
| 1st LAYER (L1) | $MgF_2$ | 1.3855 | 90.001 | 124.696 | (0.260 λ0) |
| 2nd LAYER (H) | sub-h4 | 2.0928 | 111.815 | 234.006 | (0.488 λ0) |
| 3rd LAYER (M) | $Al_2O_3$ | 1.6289 | 61.908 | 100.842 | (0.210 λ0) |
| 4th LAYER (L1) | $MgF_2$ | 1.3855 | 28.000 | 38.794 | (0.081 λ0) |
| 5th LAYER (M) | $Al_2O_3$ | 1.6289 | 83.039 | 135.262 | (0.282 λ0) |
| 6th LAYER (H) | sub-h4 | 2.0928 | 105.275 | 220.320 | (0.459 λ0) |
| 7th LAYER (M) | $Al_2O_3$ | 1.6289 | 10.500 | 17.103 | (0.036 λ0) |
| 8th LAYER (H) | sub-h4 | 2.0928 | 18.397 | 38.501 | (0.080 λ0) |
| 9th LAYER (L2) | $SiO_2$ | 1.4671 | 28.000 | 41.079 | (0.086 λ0) |
| 10th LAYER (H) | $Y_2O_3$ | 1.8065 | 24.351 | 43.990 | (0.092 λ0) |
| OPTICAL SUBSTRATE | BK-7 | 1.5163 | — | — | — |
FIG. 13B EXAMPLE 2-3
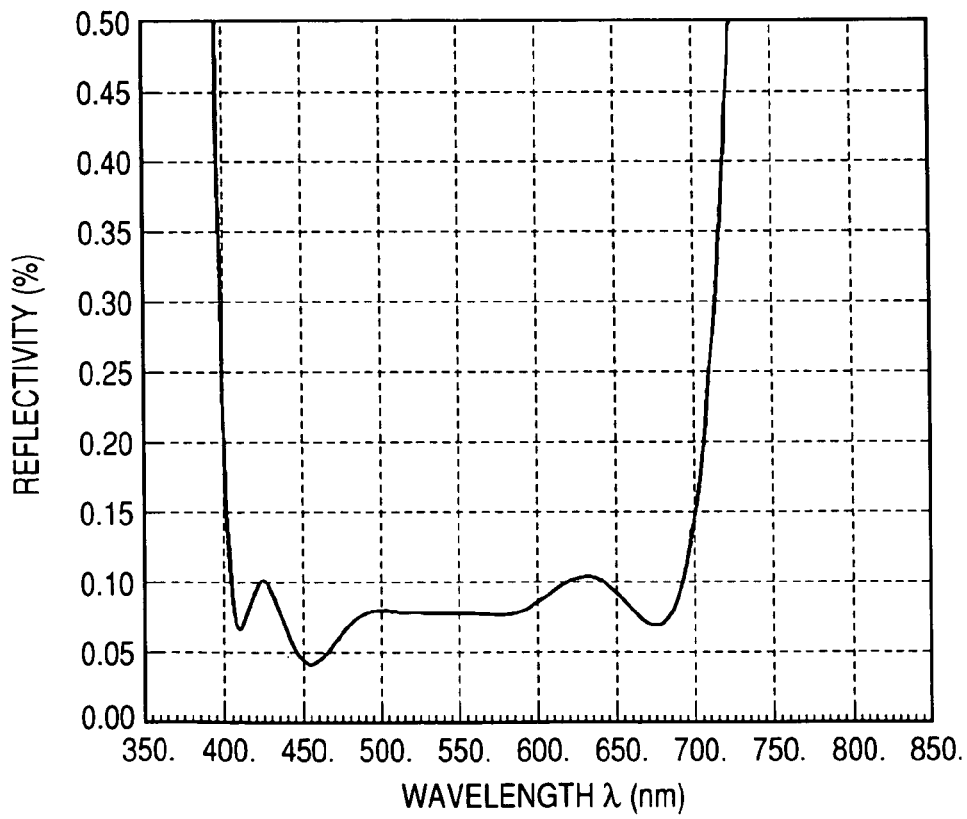

FIG. 14A EXAMPLE 2-4
CENTER WAVELENGTH λ0=480nm
| | MATERIAL | N | d | N·d | |
|---|---|---|---|---|---|
| AIR | — | — | — | — | |
| 1st LAYER (L1) | MgF$_2$ | 1.3855 | 90.140 | 124.889 | (0.260 λ0) |
| 2nd LAYER (H) | sub-h4 | 2.0928 | 112.433 | 235.300 | (0.490 λ0) |
| 3rd LAYER (M) | Al$_2$O$_3$ | 1.6289 | 65.564 | 106.797 | (0.222 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 82.756 | 134.801 | (0.281 λ0) |
| 6th LAYER (H) | sub-h4 | 2.0928 | 99.543 | 208.324 | (0.434 λ0) |
| 7th LAYER (M) | Al$_2$O$_3$ | 1.6289 | 10.500 | 17.103 | (0.036 λ0) |
| 8th LAYER (H) | sub-h4 | 2.0928 | 23.495 | 49.170 | (0.102 λ0) |
| 9th LAYER (L2) | SiO$_2$ | 1.4671 | 44.035 | 64.604 | (0.135 λ0) |
| 10th LAYER (H) | sub-h4 | 2.0928 | 11.000 | 23.021 | (0.048 λ0) |
| OPTICAL SUBSTRATE | CaF$_2$ | 1.4339 | — | — | |
FIG. 14B EXAMPLE 2-4
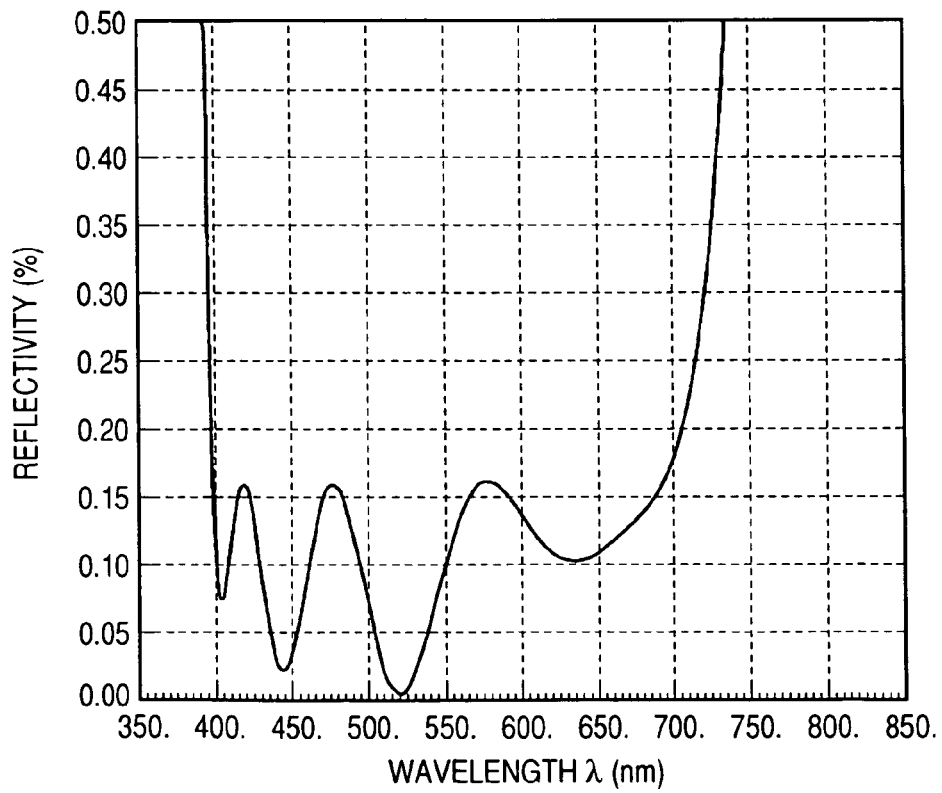

FIG. 15A EXAMPLE 2-5
CENTER WAVELENGTH λ0=480nm
|  | MATERIAL | N | d | N·d | |
|---|---|---|---|---|---|
| AIR | — | — | — | — | |
| 1st LAYER (L1) | MgF₂ | 1.3855 | 89.836 | 124.468 | (0.259 λ0) |
| 2nd LAYER (H) | sub-h4 | 2.0928 | 112.107 | 234.618 | (0.489 λ0) |
| 3rd LAYER (M) | Al₂O₃ | 1.6289 | 66.569 | 108.434 | (0.226 λ0) |
| 4th LAYER (L1) | MgF₂ | 1.3855 | 28.000 | 38.794 | (0.081 λ0) |
| 5th LAYER (M) | Al₂O₃ | 1.6289 | 81.588 | 132.899 | (0.277 λ0) |
| 6th LAYER (H) | sub-h4 | 2.0928 | 98.534 | 206.212 | (0.430 λ0) |
| 7th LAYER (M) | Al₂O₃ | 1.6289 | 10.500 | 17.103 | (0.036 λ0) |
| 8th LAYER (H) | sub-h4 | 2.0928 | 23.555 | 49.296 | (0.103 λ0) |
| 9th LAYER (L2) | SiO₂ | 1.4671 | 41.979 | 61.587 | (0.128 λ0) |
| 10th LAYER (H) | sub-h4 | 2.0928 | 11.000 | 23.021 | (0.048 λ0) |
| OPTICAL SUBSTRATE | SiO₂ | 1.4585 | — | — | |
FIG. 15B EXAMPLE 2-5
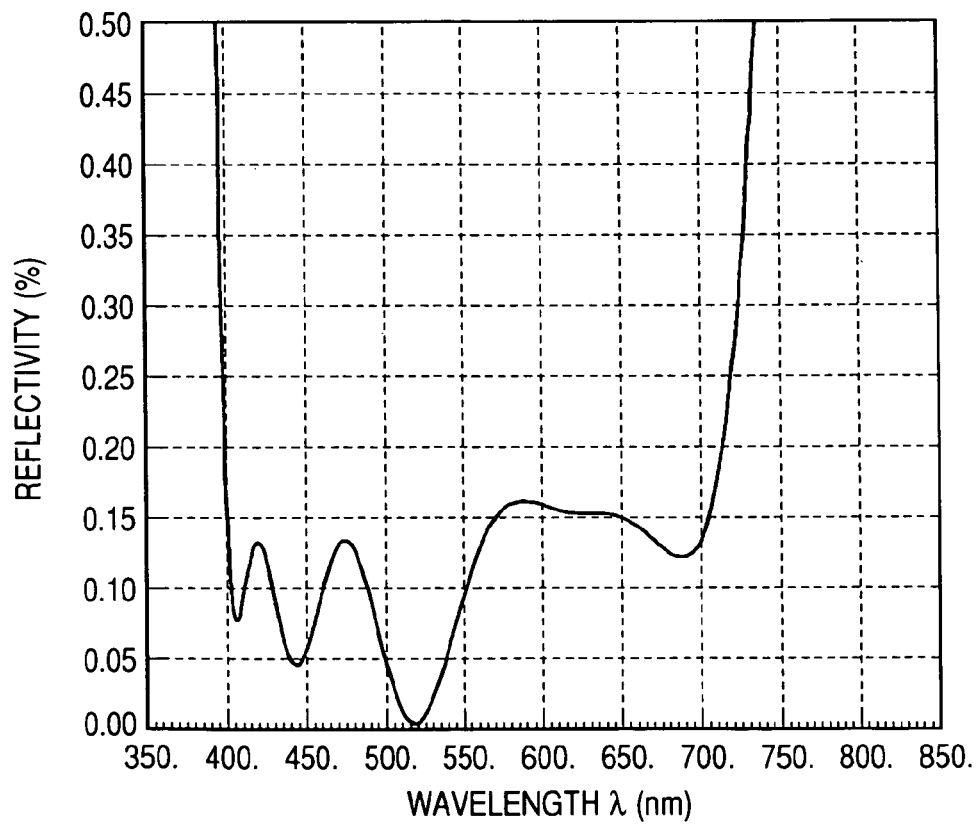

FIG. 16A EXAMPLE 2-6
CENTER WAVELENGTH λ0=480nm
|  | MATERIAL | N | d | N·d | |
|---|---|---|---|---|---|
| AIR | — | — | — | — | |
| 1st LAYER (L1) | MgF₂ | 1.3855 | 89.842 | 124.476 | (0.259 λ0) |
| 2nd LAYER (H) | sub-h4 | 2.0928 | 111.878 | 234.138 | (0.488 λ0) |
| 3rd LAYER (M) | Al₂O₃ | 1.6289 | 65.080 | 106.009 | (0.221 λ0) |
| 4th LAYER (L1) | MgF₂ | 1.3855 | 28.000 | 38.794 | (0.081 λ0) |
| 5th LAYER (M) | Al₂O₃ | 1.6289 | 81.423 | 132.630 | (0.276 λ0) |
| 6th LAYER (H) | sub-h4 | 2.0928 | 104.975 | 219.692 | (0.458 λ0) |
| 7th LAYER (M) | Al₂O₃ | 1.6289 | 10.500 | 17.103 | (0.036 λ0) |
| 8th LAYER (H) | sub-h4 | 2.0928 | 19.855 | 41.553 | (0.087 λ0) |
| 9th LAYER (L2) | SiO₂ | 1.4671 | 35.370 | 51.891 | (0.108 λ0) |
| 10th LAYER (H) | sub-h4 | 2.0928 | 11.000 | 23.021 | (0.048 λ0) |
| OPTICAL SUBSTRATE | BK-7 | 1.5163 | — | — | |
FIG. 16B EXAMPLE 2-6
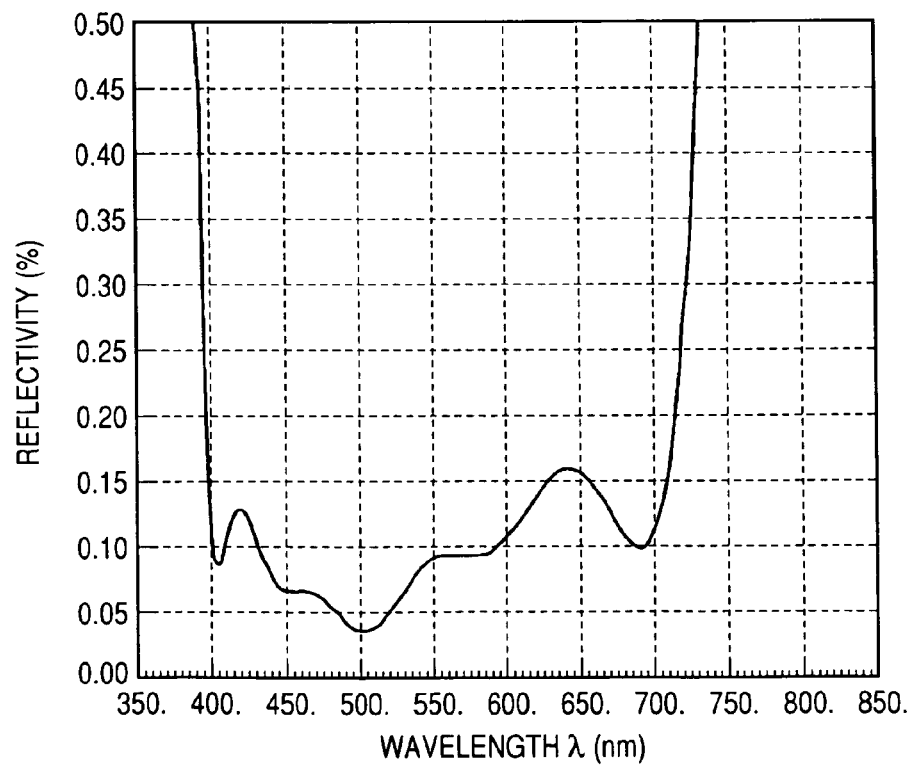

FIG. 17A EXAMPLE 2-7
CENTER WAVELENGTH λ0=480nm
|  | MATERIAL | N | d | N·d | |
|---|---|---|---|---|---|
| AIR | — | — | — | — | |
| 1st LAYER (L1) | MgF$_2$ | 1.3855 | 89.831 | 124.461 | (0.259 λ0) |
| 2nd LAYER (H) | sub-h4 | 2.0928 | 111.996 | 234.385 | (0.488 λ0) |
| 3rd LAYER (M) | Al$_2$O$_3$ | 1.6289 | 65.210 | 106.221 | (0.221 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 81.718 | 133.110 | (0.277 λ0) |
| 6th LAYER (H) | sub-h4 | 2.0928 | 111.683 | 233.730 | (0.487 λ0) |
| 7th LAYER (M) | Al$_2$O$_3$ | 1.6289 | 10.500 | 17.103 | (0.036 λ0) |
| 8th LAYER (H) | sub-h4 | 2.0928 | 15.718 | 32.895 | (0.069 λ0) |
| 9th LAYER (L2) | SiO$_2$ | 1.4671 | 28.000 | 41.079 | (0.086 λ0) |
| 10th LAYER (H) | sub-h4 | 2.0928 | 11.879 | 24.860 | (0.052 λ0) |
| OPTICAL SUBSTRATE | LF1 | 1.5731 | — | — | — |
FIG. 17B EXAMPLE 2-7
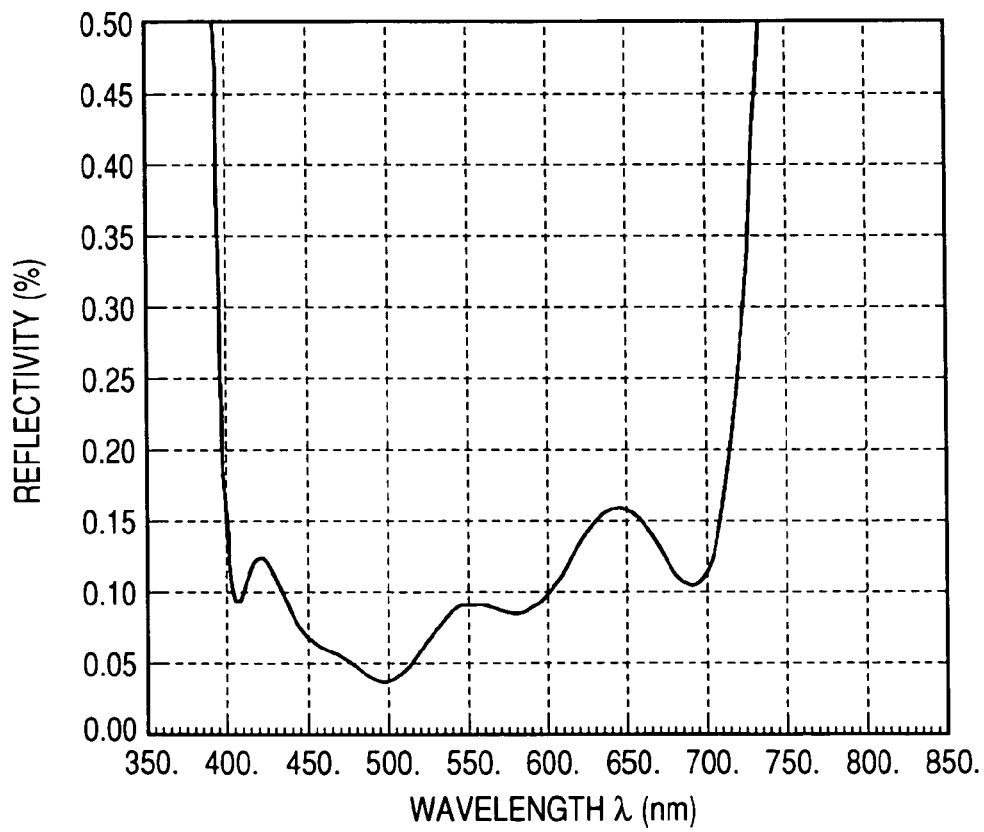

FIG. 18A EXAMPLE 2-8
CENTER WAVELENGTH λ0=480nm
|  | MATERIAL | N | d | N·d |  |
|---|---|---|---|---|---|
| AIR | — | — | — | — |  |
| 1st LAYER (L1) | MgF₂ | 1.3855 | 89.880 | 124.529 | (0.259 λ0) |
| 2nd LAYER (H) | sub-h4 | 2.0928 | 111.876 | 234.134 | (0.488 λ0) |
| 3rd LAYER (M) | Al₂O₃ | 1.6289 | 62.886 | 102.435 | (0.213 λ0) |
| 4th LAYER (L1) | MgF₂ | 1.3855 | 28.000 | 38.794 | (0.081 λ0) |
| 5th LAYER (M) | Al₂O₃ | 1.6289 | 83.596 | 136.170 | (0.284 λ0) |
| 6th LAYER (H) | sub-h4 | 2.0928 | 110.043 | 230.298 | (0.480 λ0) |
| 7th LAYER (M) | Al₂O₃ | 1.6289 | 10.500 | 17.103 | (0.036 λ0) |
| 8th LAYER (H) | sub-h4 | 2.0928 | 18.646 | 39.022 | (0.081 λ0) |
| 9th LAYER (L2) | SiO₂ | 1.4671 | 28.000 | 41.079 | (0.086 λ0) |
| 10th LAYER (H) | sub-h4 | 2.0928 | 12.224 | 25.582 | (0.053 λ0) |
| OPTICAL SUBSTRATE | F-3 | 1.6129 | — | — | — |
FIG. 18B EXAMPLE 2-8
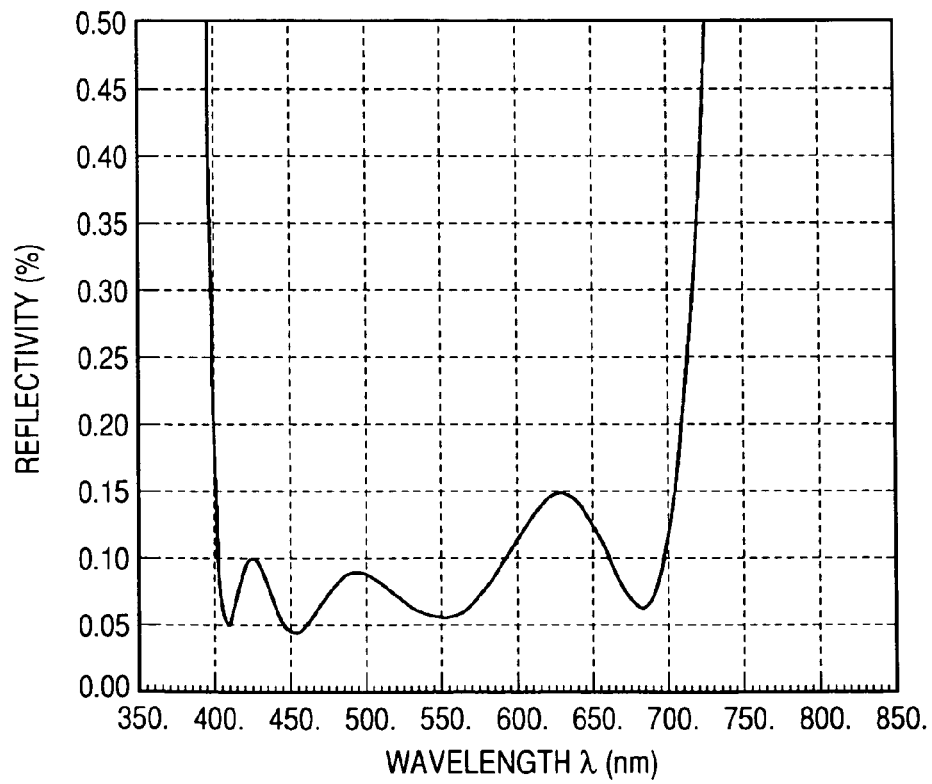

FIG. 19A EXAMPLE 3-1
CENTER WAVELENGTH λ0=480nm
| | MATERIAL | N | d | N·d | |
|---|---|---|---|---|---|
| AIR | — | — | — | — | |
| 1st LAYER (L1) | MgF$_2$ | 1.3855 | 90.677 | 125.633 | (0.262 λ0) |
| 2nd LAYER (H) | sub-h4 | 2.0928 | 112.675 | 235.806 | (0.491 λ0) |
| 3rd LAYER (M) | Al$_2$O$_3$ | 1.6289 | 63.263 | 103.049 | (0.215 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 84.611 | 137.823 | (0.287 λ0) |
| 6th LAYER (H) | sub-h4 | 2.0928 | 112.406 | 235.243 | (0.490 λ0) |
| 7th LAYER (M) | Al$_2$O$_3$ | 1.6289 | 10.500 | 17.103 | (0.036 λ0) |
| 8th LAYER (H) | sub-h4 | 2.0928 | 25.158 | 52.651 | (0.110 λ0) |
| 9th LAYER (L2) | SiO$_2$ | 1.4671 | 35.278 | 51.756 | (0.108 λ0) |
| 10th LAYER (H) | sub-h4 | 2.0928 | 24.178 | 50.600 | (0.105 λ0) |
| 11th LAYER (L2) | SiO$_2$ | 1.4671 | 49.299 | 72.327 | (0.151 λ0) |
| 12th LAYER (H) | sub-h4 | 2.0928 | 11.000 | 23.021 | (0.048 λ0) |
| OPTICAL SUBSTRATE | F-3 | 1.6129 | — | — | — |
FIG. 19B EXAMPLE 3-1
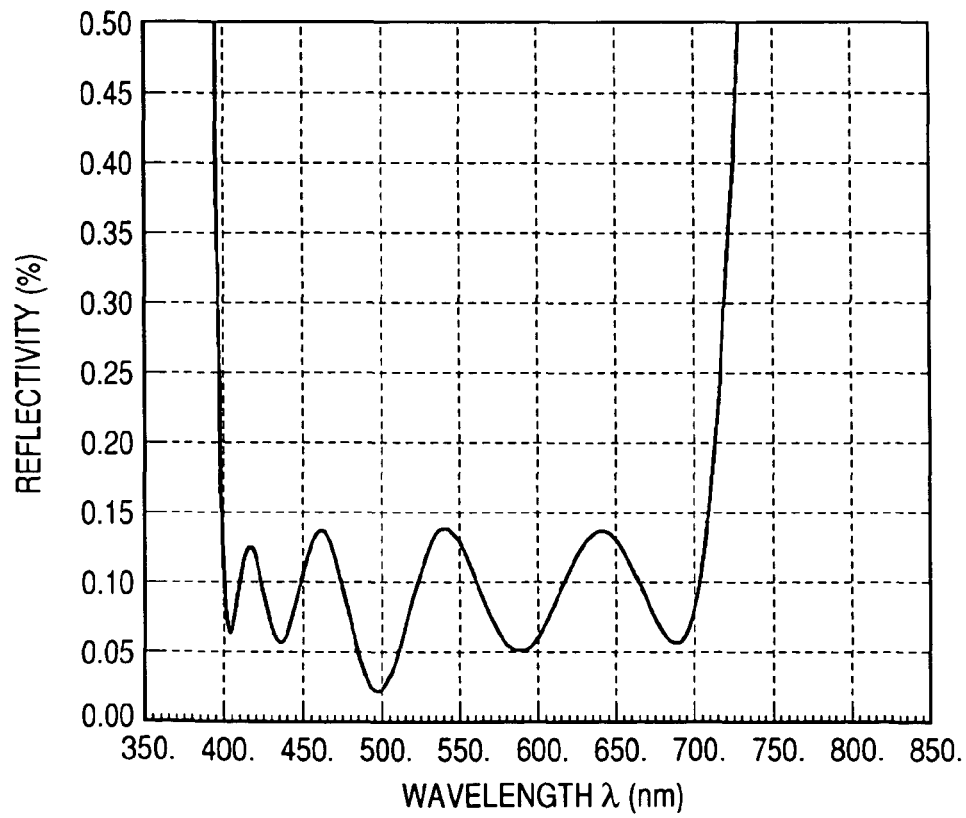

FIG. 20A EXAMPLE 3-2
CENTER WAVELENGTH λ0=480nm
|  | MATERIAL | N | d | N·d |  |
|---|---|---|---|---|---|
| AIR | — | — | — | — |  |
| 1st LAYER (L1) | MgF$_2$ | 1.3855 | 90.608 | 125.537 | (0.262 λ0) |
| 2nd LAYER (H) | sub-h4 | 2.0928 | 112.418 | 235.268 | (0.490 λ0) |
| 3rd LAYER (M) | Al$_2$O$_3$ | 1.6289 | 62.961 | 102.557 | (0.214 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 84.460 | 137.577 | (0.287 λ0) |
| 6th LAYER (H) | sub-h4 | 2.0928 | 109.964 | 230.133 | (0.479 λ0) |
| 7th LAYER (M) | Al$_2$O$_3$ | 1.6289 | 10.500 | 17.103 | (0.036 λ0) |
| 8th LAYER (H) | sub-h4 | 2.0928 | 26.199 | 54.829 | (0.114 λ0) |
| 9th LAYER (L2) | SiO$_2$ | 1.4671 | 35.218 | 51.668 | (0.108 λ0) |
| 10th LAYER (H) | sub-h4 | 2.0928 | 24.840 | 51.985 | (0.108 λ0) |
| 11th LAYER (L2) | SiO$_2$ | 1.4671 | 44.789 | 65.710 | (0.137 λ0) |
| 12th LAYER (H) | sub-h4 | 2.0928 | 11.000 | 23.021 | (0.048 λ0) |
| OPTICAL SUBSTRATE | BASF-2 | 1.6645 | — | — | — |
FIG. 20B EXAMPLE 3-2
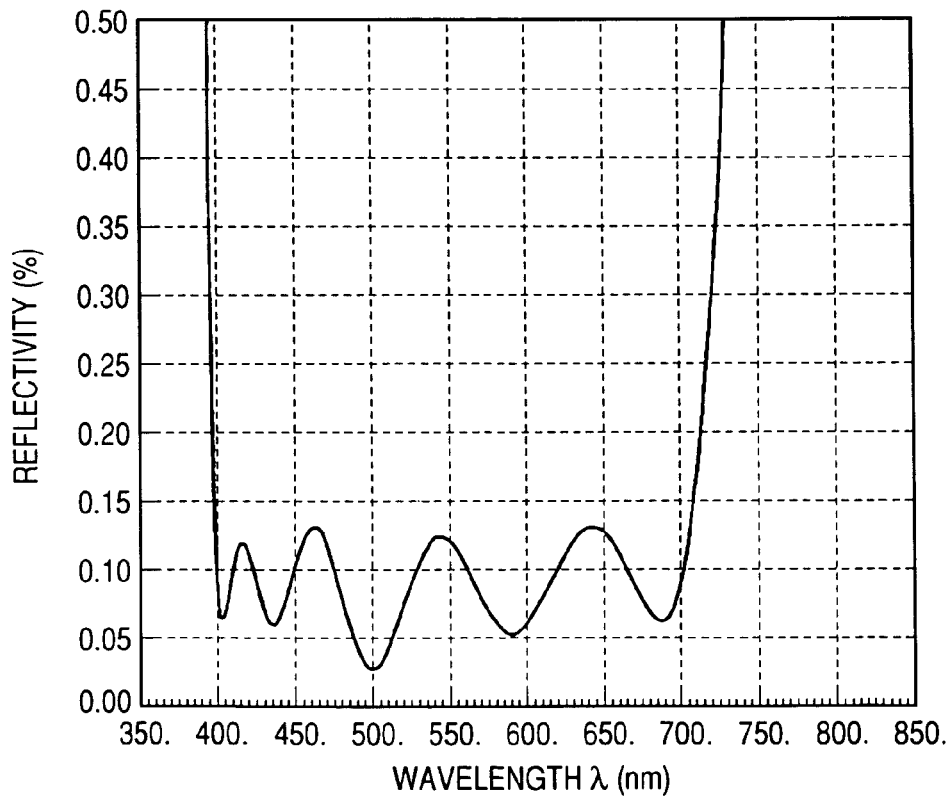

FIG. 21A EXAMPLE 4-1
CENTER WAVELENGTH λ0=480nm
|  | MATERIAL | N | d | N·d | |
|---|---|---|---|---|---|
| AIR | — | — | — | — | |
| 1st LAYER (L) | MgF2 | 1.3855 | 90.937 | 125.993 | (0.262 λ0) |
| 2nd LAYER (H) | sub-h4 | 2.0928 | 113.259 | 237.028 | (0.494 λ0) |
| 3rd LAYER (M) | Al2O3 | 1.6289 | 64.664 | 105.331 | (0.219 λ0) |
| 4th LAYER (L) | MgF2 | 1.3855 | 28.000 | 38.794 | (0.081 λ0) |
| 5th LAYER (M) | Al2O3 | 1.6289 | 85.560 | 139.369 | (0.290 λ0) |
| 6th LAYER (H) | sub-h4 | 2.0928 | 136.503 | 285.673 | (0.595 λ0) |
| 7th LAYER (M) | Al2O3 | 1.6289 | 33.416 | 54.431 | (0.113 λ0) |
| 8th LAYER (H) | sub-h4 | 2.0928 | 25.511 | 53.389 | (0.111 λ0) |
| 9th LAYER (M) | Al2O3 | 1.6289 | 50.939 | 82.975 | (0.173 λ0) |
| 10th LAYER (H) | sub-h4 | 2.0928 | 11.000 | 23.021 | (0.048 λ0) |
| OPTICAL SUBSTRATE | SF1 | 1.7174 | — | — | — |
FIG. 21B EXAMPLE 4-1
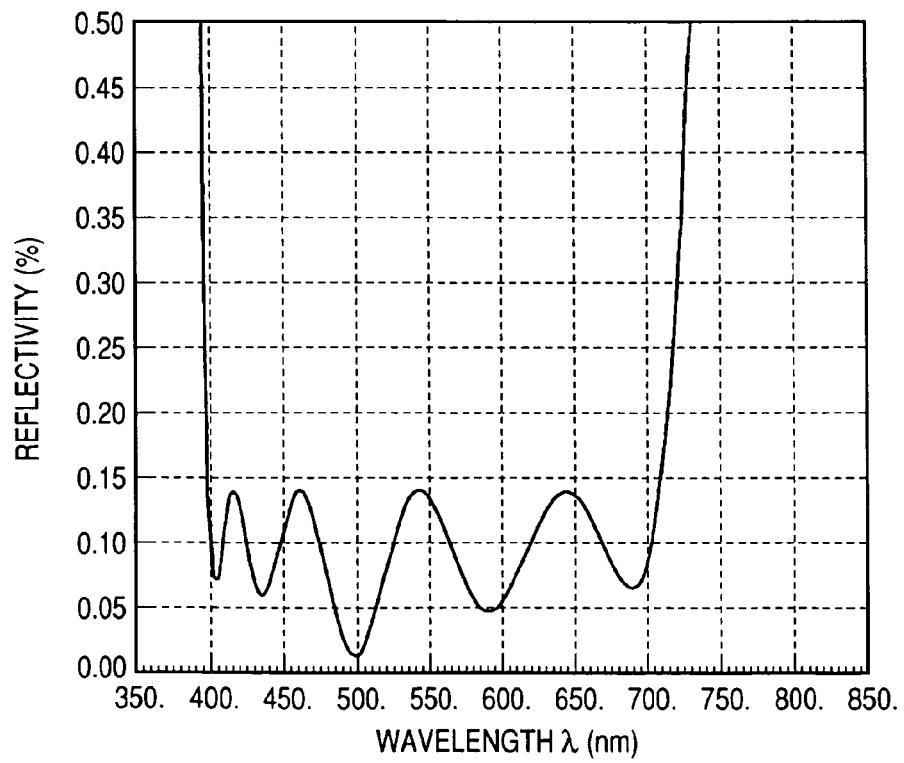

FIG. 22A EXAMPLE 4-2
CENTER WAVELENGTH λ0=480nm
|  | MATERIAL | N | d | N·d | |
|---|---|---|---|---|---|
| AIR | — | — | — | — | |
| 1st LAYER (L) | MgF₂ | 1.3855 | 90.821 | 125.832 | (0.262 λ0) |
| 2nd LAYER (H) | sub-h4 | 2.0928 | 113.087 | 236.668 | (0.493 λ0) |
| 3rd LAYER (M) | Al₂O₃ | 1.6289 | 64.618 | 105.256 | (0.219 λ0) |
| 4th LAYER (L) | MgF₂ | 1.3855 | 28.000 | 38.794 | (0.081 λ0) |
| 5th LAYER (M) | Al₂O₃ | 1.6289 | 85.130 | 138.668 | (0.289 λ0) |
| 6th LAYER (H) | sub-h4 | 2.0928 | 135.631 | 283.849 | (0.591 λ0) |
| 7th LAYER (M) | Al₂O₃ | 1.6289 | 32.766 | 53.373 | (0.111 λ0) |
| 8th LAYER (H) | sub-h4 | 2.0928 | 26.093 | 54.607 | (0.114 λ0) |
| 9th LAYER (M) | Al₂O₃ | 1.6289 | 45.500 | 74.115 | (0.154 λ0) |
| 10th LAYER (H) | sub-h4 | 2.0928 | 11.000 | 23.021 | (0.048 λ0) |
| OPTICAL SUBSTRATE | SF14 | 1.7618 | — | — | — |
FIG. 22B EXAMPLE 4-2
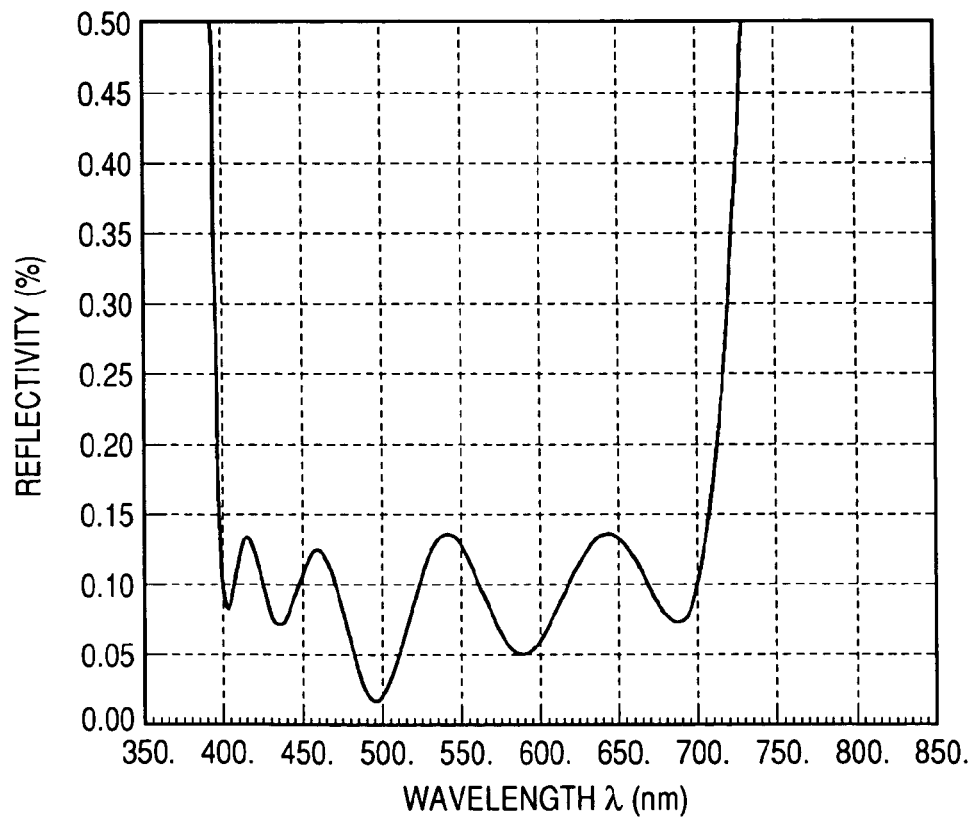

FIG. 23A EXAMPLE 4-3
CENTER WAVELENGTH λ0=480nm
| | MATERIAL | N | d | N·d | |
|---|---|---|---|---|---|
| AIR | — | — | — | — | |
| 1st LAYER (L) | MgF₂ | 1.3855 | 90.717 | 125.688 | (0.262 λ0) |
| 2nd LAYER (H) | sub-h4 | 2.0928 | 112.761 | 235.986 | (0.492 λ0) |
| 3rd LAYER (M) | Al₂O₃ | 1.6289 | 63.683 | 103.733 | (0.216 λ0) |
| 4th LAYER (L) | MgF₂ | 1.3855 | 28.000 | 38.794 | (0.081 λ0) |
| 5th LAYER (M) | Al₂O₃ | 1.6289 | 85.076 | 138.580 | (0.289 λ0) |
| 6th LAYER (H) | sub-h4 | 2.0928 | 137.597 | 287.963 | (0.600 λ0) |
| 7th LAYER (M) | Al₂O₃ | 1.6289 | 24.765 | 40.340 | (0.084 λ0) |
| 8th LAYER (H) | sub-h4 | 2.0928 | 38.354 | 80.267 | (0.167 λ0) |
| 9th LAYER (M) | Al₂O₃ | 1.6289 | 22.168 | 36.109 | (0.075 λ0) |
| 10th LAYER (H) | sub-h4 | 2.0928 | 20.000 | 41.856 | (0.087 λ0) |
| OPTICAL SUBSTRATE | S-LAH79 | 2.0033 | — | — | |
FIG. 23B EXAMPLE 4-3
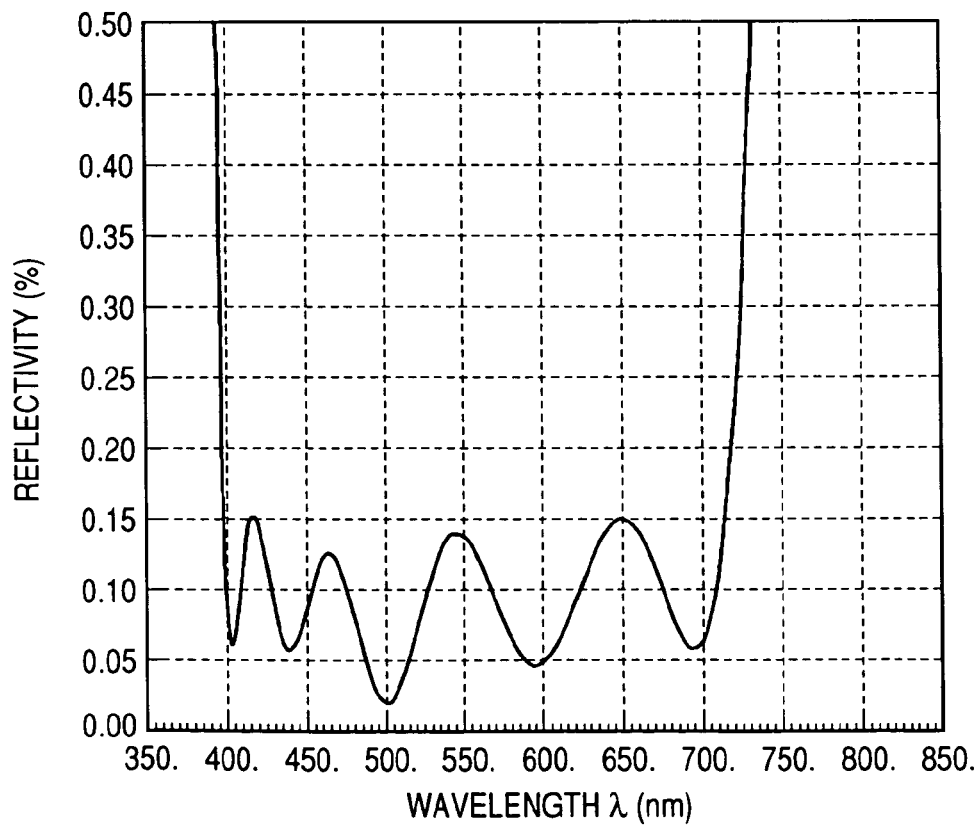

FIG. 24A EXAMPLE 4-4

CENTER WAVELENGTH $\lambda 0 = 690$ nm

| | MATERIAL | N | d | N·d | |
|---|---|---|---|---|---|
| AIR | — | — | — | — | |
| 1st LAYER (L) | MgF$_2$ | 1.3855 | 127.310 | 176.388 | (0.256 $\lambda 0$) |
| 2nd LAYER (H) | sub-h4 | 2.0928 | 162.545 | 340.174 | (0.493 $\lambda 0$) |
| 3rd LAYER (M) | Al$_2$O$_3$ | 1.6289 | 90.093 | 146.752 | (0.213 $\lambda 0$) |
| 4th LAYER (L) | MgF$_2$ | 1.3855 | 40.000 | 55.420 | (0.080 $\lambda 0$) |
| 5th LAYER (M) | Al$_2$O$_3$ | 1.6289 | 122.092 | 198.876 | (0.288 $\lambda 0$) |
| 6th LAYER (H) | sub-h4 | 2.0928 | 196.074 | 410.344 | (0.595 $\lambda 0$) |
| 7th LAYER (M) | Al$_2$O$_3$ | 1.6289 | 44.879 | 73.103 | (0.106 $\lambda 0$) |
| 8th LAYER (H) | sub-h4 | 2.0928 | 40.271 | 84.279 | (0.122 $\lambda 0$) |
| 9th LAYER (M) | Al$_2$O$_3$ | 1.6289 | 61.838 | 100.728 | (0.146 $\lambda 0$) |
| 10th LAYER (H) | sub-h4 | 2.0928 | 17.000 | 35.578 | (0.052 $\lambda 0$) |
| OPTICAL SUBSTRATE | SF14 | 1.7618 | — | — | |

FIG. 24B EXAMPLE 4-4

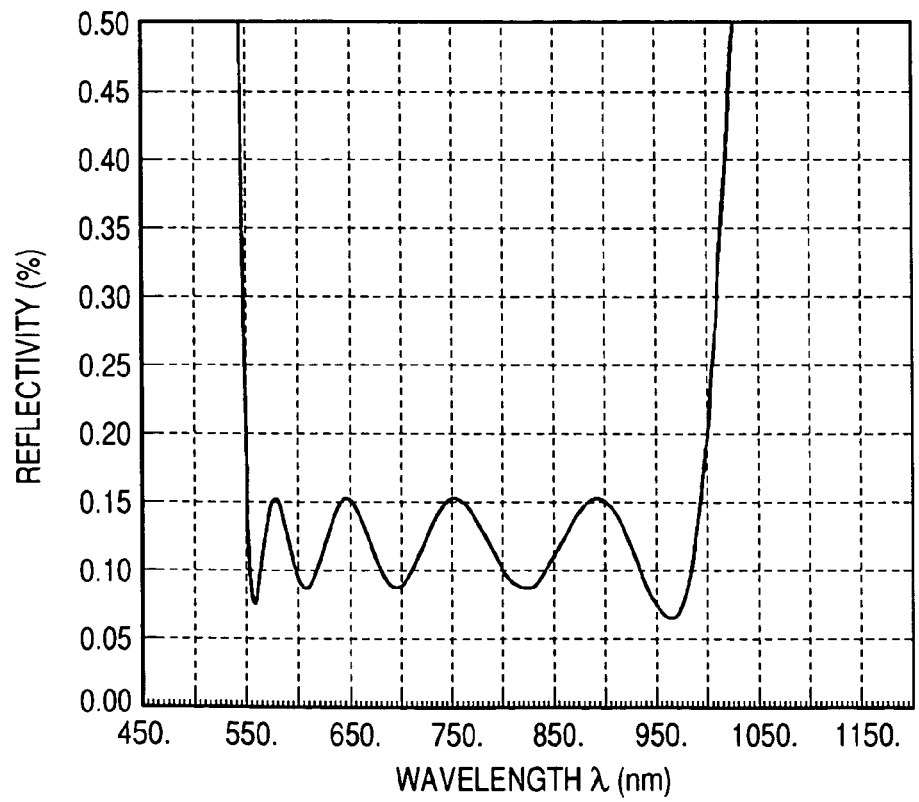

FIG. 25A EXAMPLE 5-1
CENTER WAVELENGTH λ0=480nm
|  | MATERIAL | N | d | N·d | |
|---|---|---|---|---|---|
| AIR | — | — | — | — | |
| 1st LAYER (L) | MgF₂ | 1.3855 | 90.250 | 125.041 | (0.261 λ0) |
| 2nd LAYER (H) | sub-h4 | 2.0928 | 112.637 | 235.727 | (0.491 λ0) |
| 3rd LAYER (M) | Al₂O₃ | 1.6289 | 65.383 | 106.502 | (0.222 λ0) |
| 4th LAYER (L) | MgF₂ | 1.3855 | 28.000 | 38.794 | (0.081 λ0) |
| 5th LAYER (M) | Al₂O₃ | 1.6289 | 82.943 | 135.106 | (0.281 λ0) |
| 6th LAYER (H) | sub-h4 | 2.0928 | 128.101 | 268.090 | (0.559 λ0) |
| 7th LAYER (M) | Al₂O₃ | 1.6289 | 33.268 | 54.190 | (0.113 λ0) |
| 8th LAYER (H) | sub-h4 | 2.0928 | 17.765 | 37.179 | (0.077 λ0) |
| 9th LAYER (M) | Al₂O₃ | 1.6289 | 32.755 | 53.355 | (0.111 λ0) |
| OPTICAL SUBSTRATE | SF1 | 1.7174 | — | — | |
FIG. 25B EXAMPLE 5-1
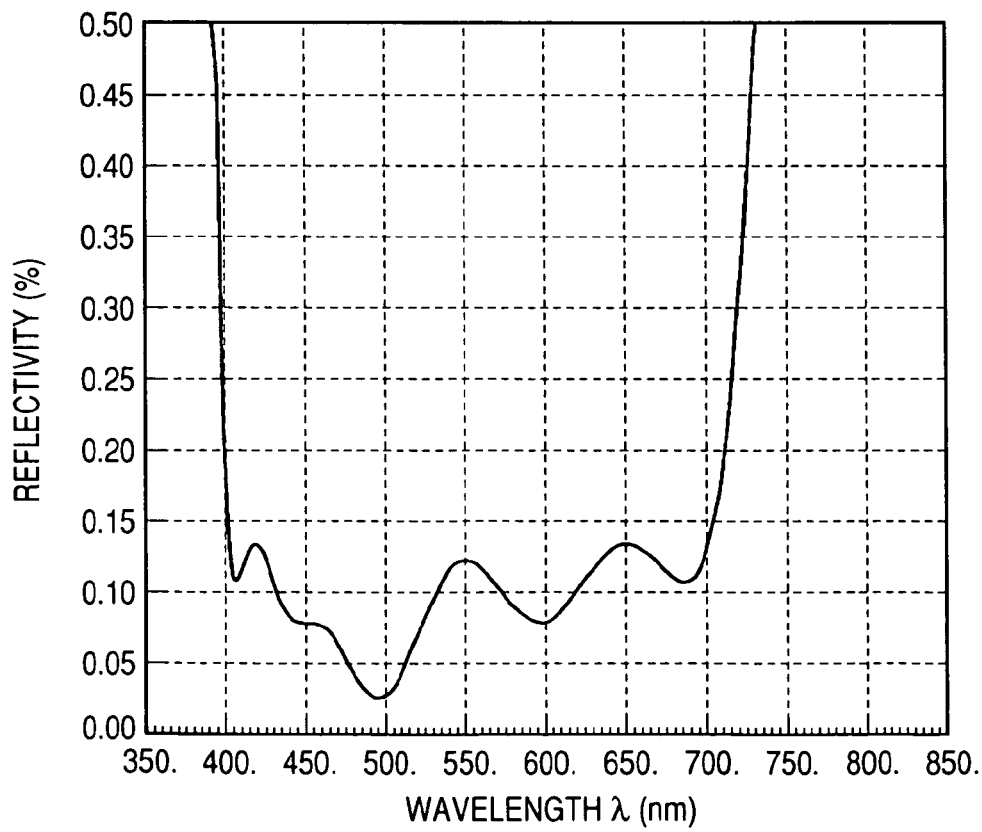

FIG. 26A EXAMPLE 5-2
CENTER WAVELENGTH λ0=480nm
|  | MATERIAL | N | d | N·d | |
|---|---|---|---|---|---|
| AIR | — | — | — | — | |
| 1st LAYER (L) | MgF2 | 1.3855 | 90.420 | 125.277 | (0.261 λ) |
| 2nd LAYER (H) | sub-h4 | 2.0928 | 112.408 | 235.247 | (0.490 λ) |
| 3rd LAYER (M) | Al2O3 | 1.6289 | 64.662 | 105.328 | (0.219 λ) |
| 4th LAYER (L) | MgF2 | 1.3855 | 28.000 | 38.794 | (0.081 λ) |
| 5th LAYER (M) | Al2O3 | 1.6289 | 83.873 | 136.621 | (0.285 λ) |
| 6th LAYER (H) | sub-h4 | 2.0928 | 129.909 | 271.874 | (0.566 λ) |
| 7th LAYER (M) | Al2O3 | 1.6289 | 31.187 | 50.801 | (0.106 λ) |
| 8th LAYER (H) | sub-h4 | 2.0928 | 20.742 | 43.409 | (0.090 λ) |
| 9th LAYER (M) | Al2O3 | 1.6289 | 27.826 | 45.326 | (0.094 λ) |
| OPTICAL SUBSTRATE | SF14 | 1.7618 | — | — | |
FIG. 26B EXAMPLE 5-2
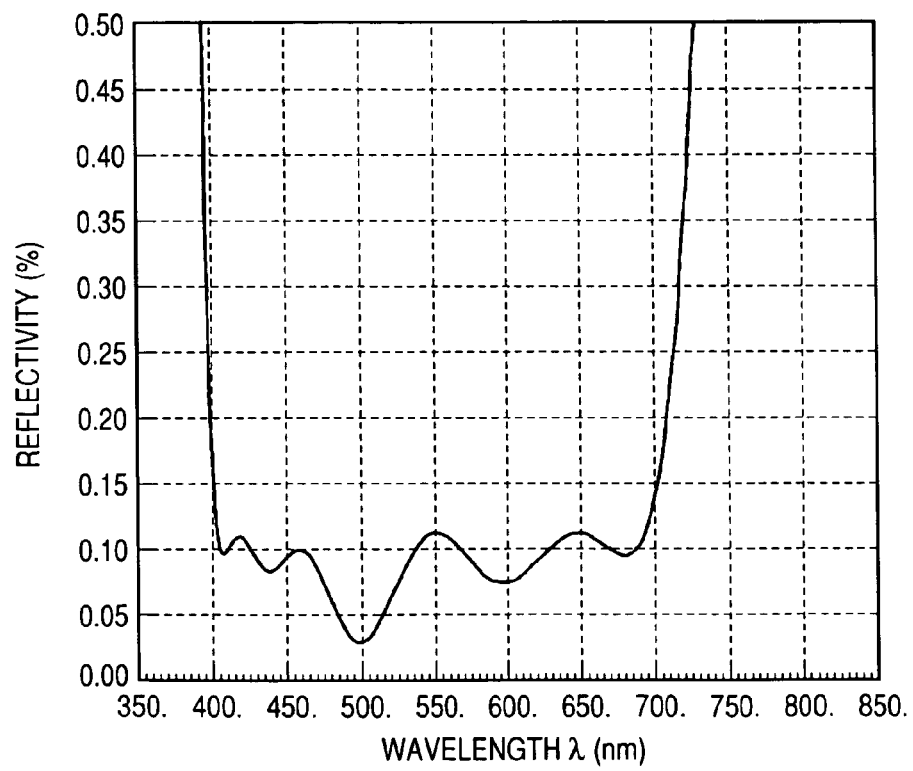

FIG. 27A EXAMPLE 5-3
CENTER WAVELENGTH λ0=480nm
|  | MATERIAL | N | d | N·d | |
|---|---|---|---|---|---|
| AIR | — | — | — | — | |
| 1st LAYER (L) | MgF$_2$ | 1.3855 | 90.393 | 125.240 | (0.261 λ0) |
| 2nd LAYER (H) | sub-h4 | 2.0928 | 112.663 | 235.781 | (0.490 λ0) |
| 3rd LAYER (M) | Al$_2$O$_3$ | 1.6289 | 64.903 | 105.720 | (0.220 λ0) |
| 4th LAYER (L) | MgF$_2$ | 1.3855 | 28.000 | 38.794 | (0.081 λ0) |
| 5th LAYER (M) | Al$_2$O$_3$ | 1.6289 | 83.677 | 136.301 | (0.284 λ0) |
| 6th LAYER (H) | sub-h4 | 2.0928 | 131.436 | 275.069 | (0.573 λ0) |
| 7th LAYER (M) | Al$_2$O$_3$ | 1.6289 | 31.092 | 50.646 | (0.106 λ0) |
| 8th LAYER (H) | sub-h4 | 2.0928 | 22.924 | 47.975 | (0.100 λ0) |
| 9th LAYER (M) | Al$_2$O$_3$ | 1.6289 | 27.715 | 45.145 | (0.094 λ0) |
| OPTICAL SUBSTRATE | SF6 | 1.8052 | — | — | |
FIG. 27B EXAMPLE 5-3
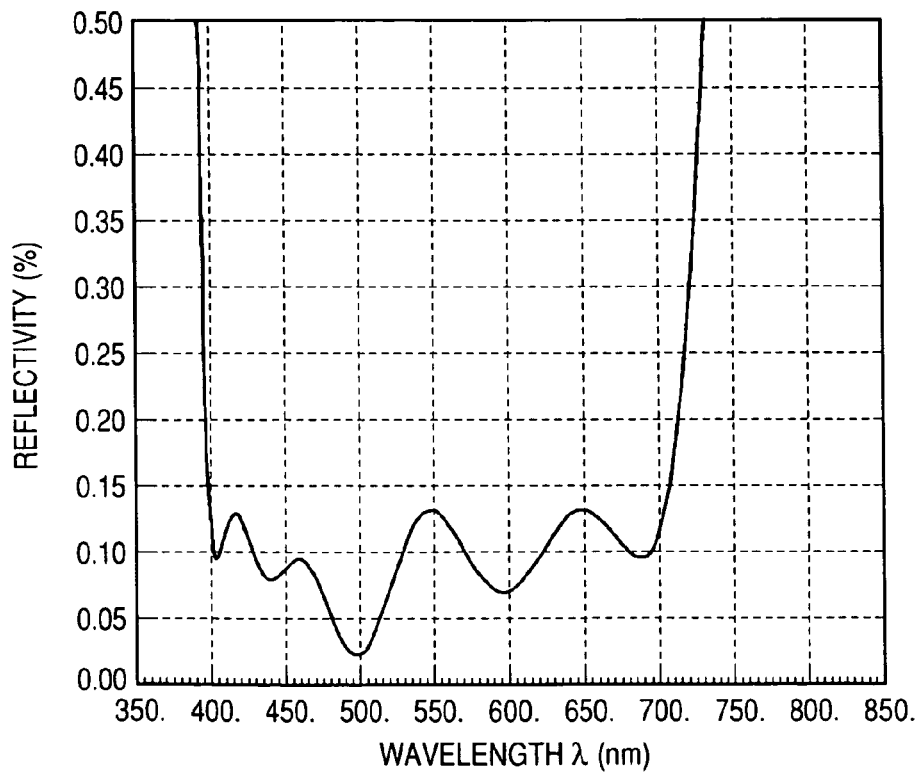

FIG. 28A EXAMPLE 5-4
CENTER WAVELENGTH λ0=480nm
|  | MATERIAL | N | d | N·d |  |
|---|---|---|---|---|---|
| AIR | — | — | — | — |  |
| 1st LAYER (L) | MgF2 | 1.3855 | 90.553 | 125.461 | (0.261 λ0) |
| 2nd LAYER (H) | sub-h4 | 2.0928 | 112.649 | 235.752 | (0.491 λ0) |
| 3rd LAYER (M) | Al2O3 | 1.6289 | 64.648 | 105.305 | (0.219 λ0) |
| 4th LAYER (L) | MgF2 | 1.3855 | 28.000 | 38.794 | (0.081 λ0) |
| 5th LAYER (M) | Al2O3 | 1.6289 | 84.047 | 136.904 | (0.285 λ0) |
| 6th LAYER (H) | sub-h4 | 2.0928 | 133.896 | 280.218 | (0.584 λ0) |
| 7th LAYER (M) | Al2O3 | 1.6289 | 27.766 | 45.228 | (0.094 λ0) |
| 8th LAYER (H) | sub-h4 | 2.0928 | 27.473 | 57.495 | (0.120 λ0) |
| 9th LAYER (M) | Al2O3 | 1.6289 | 22.833 | 37.193 | (0.077 λ0) |
| OPTICAL SUBSTRATE | LASF-N17 | 1.883 | — | — |  |
FIG. 28B EXAMPLE 5-4
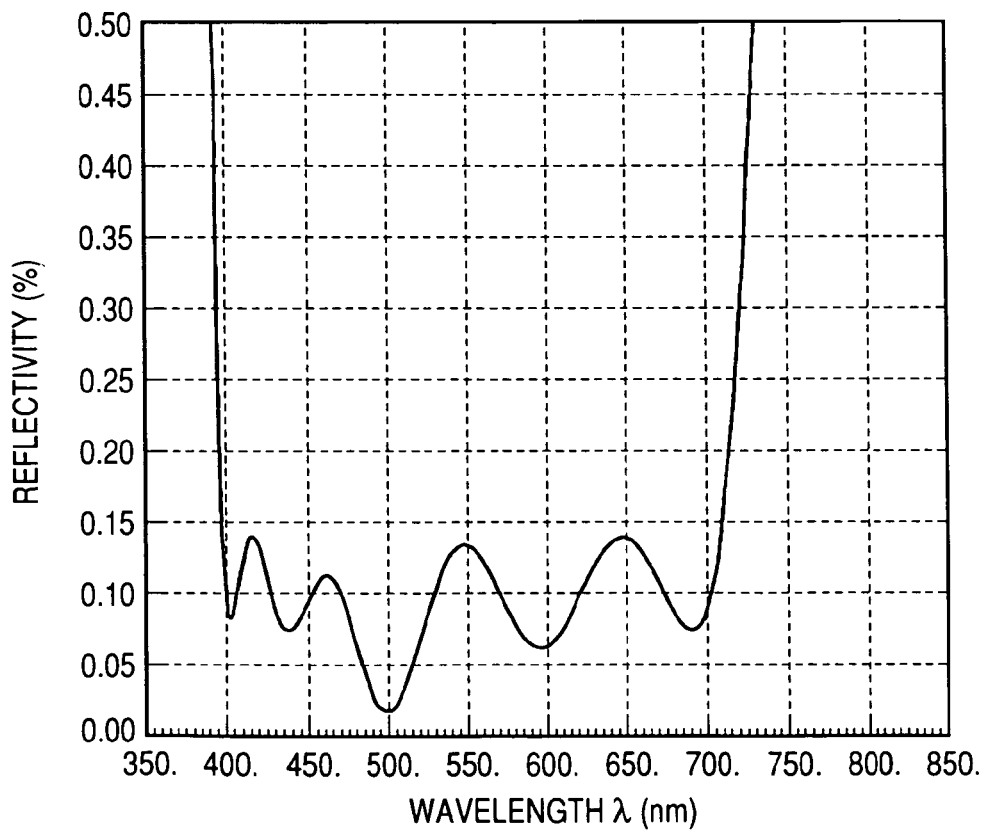

FIG. 29A EXAMPLE 5-5
CENTER WAVELENGTH λ0=480nm
|  | MATERIAL | N | d | N·d | |
|---|---|---|---|---|---|
| AIR | — | — | — | — | |
| 1st LAYER (L) | MgF₂ | 1.3855 | 90.607 | 125.536 | (0.262 λ) |
| 2nd LAYER (H) | sub-h4 | 2.0928 | 112.733 | 235.928 | (0.492 λ) |
| 3rd LAYER (M) | Al₂O₃ | 1.6289 | 64.514 | 105.087 | (0.219 λ) |
| 4th LAYER (L) | MgF₂ | 1.3855 | 28.000 | 38.794 | (0.081 λ) |
| 5th LAYER (M) | Al₂O₃ | 1.6289 | 84.379 | 137.445 | (0.286 λ) |
| 6th LAYER (H) | sub-h4 | 2.0928 | 134.618 | 281.729 | (0.587 λ) |
| 7th LAYER (M) | Al₂O₃ | 1.6289 | 28.645 | 46.660 | (0.097 λ) |
| 8th LAYER (H) | sub-h4 | 2.0928 | 30.014 | 62.813 | (0.131 λ) |
| 9th LAYER (M) | Al₂O₃ | 1.6289 | 23.323 | 37.991 | (0.079 λ) |
| OPTICAL SUBSTRATE | LASF-N17 | 1.883 | — | — | |
FIG. 29B EXAMPLE 5-5
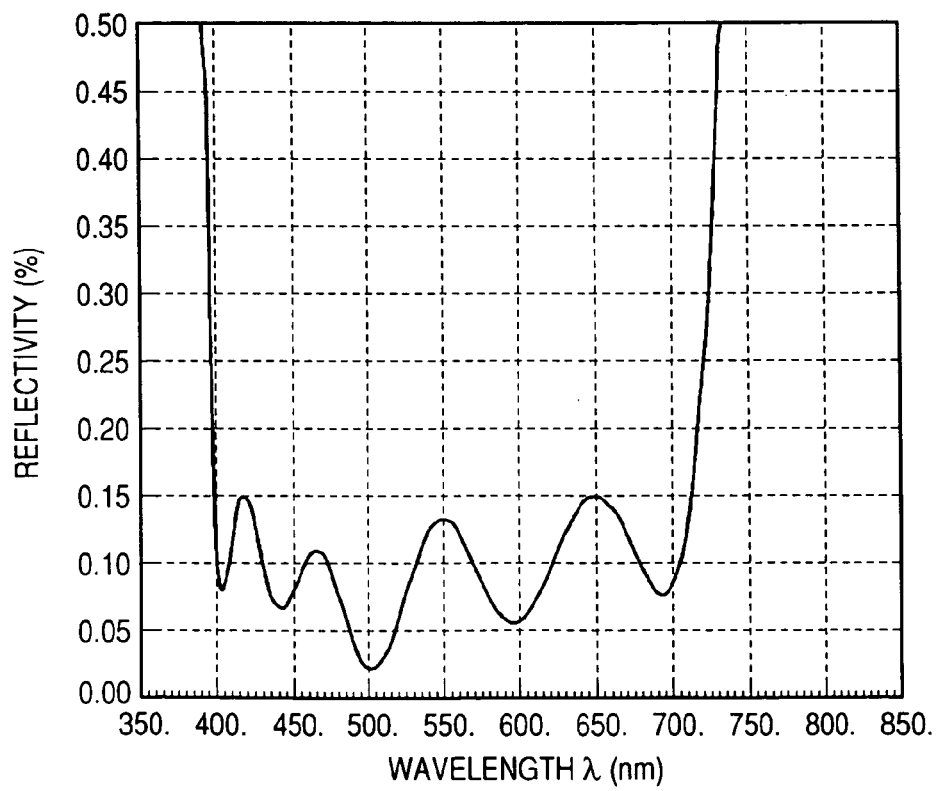

FIG. 30A EXAMPLE 5-6
CENTER WAVELENGTH λ0=480nm
| | MATERIAL | N | d | N·d | |
|---|---|---|---|---|---|
| AIR | — | — | — | — | |
| 1st LAYER (L) | MgF₂ | 1.3855 | 90.630 | 125.568 | (0.262 λ0) |
| 2nd LAYER (H) | sub-h4 | 2.0928 | 112.656 | 235.766 | (0.491 λ0) |
| 3rd LAYER (M) | Al₂O₃ | 1.6289 | 63.676 | 103.722 | (0.216 λ0) |
| 4th LAYER (L) | MgF₂ | 1.3855 | 28.000 | 38.794 | (0.081 λ0) |
| 5th LAYER (M) | Al₂O₃ | 1.6289 | 84.865 | 137.237 | (0.288 λ0) |
| 6th LAYER (H) | sub-h4 | 2.0928 | 136.838 | 286.375 | (0.597 λ0) |
| 7th LAYER (M) | Al₂O₃ | 1.6289 | 24.294 | 39.572 | (0.082 λ0) |
| 8th LAYER (H) | sub-h4 | 2.0928 | 35.438 | 74.165 | (0.155 λ0) |
| 9th LAYER (M) | Al₂O₃ | 1.6289 | 18.521 | 30.169 | (0.063 λ0) |
| OPTICAL SUBSTRATE | LASF-N17 | 1.883 | — | — | — |
FIG. 30B EXAMPLE 5-6
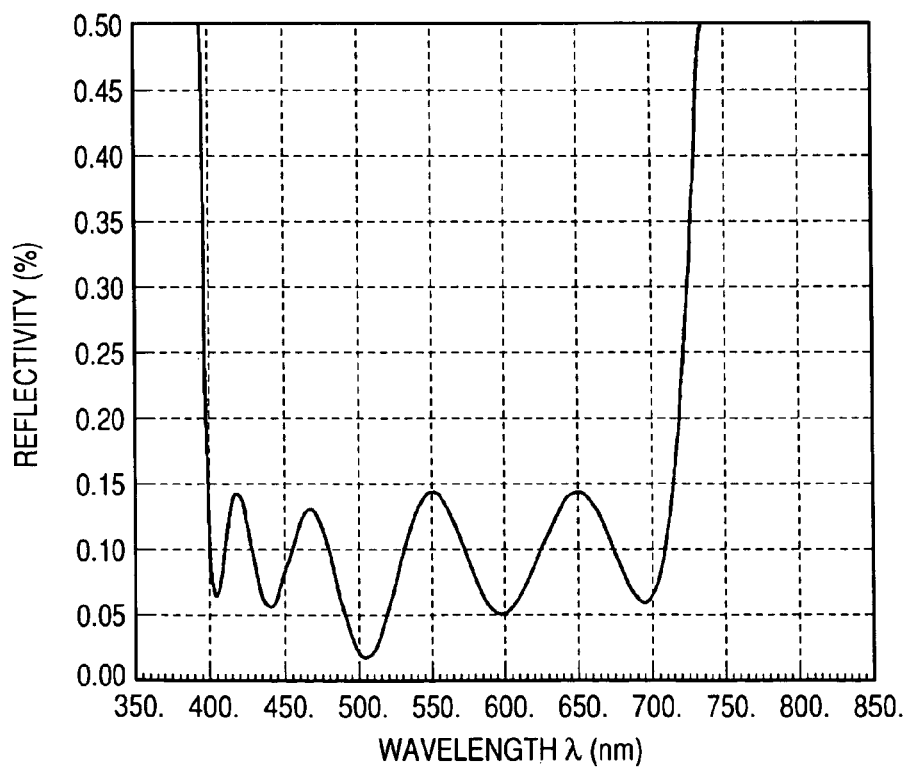

FIG. 31A EXAMPLE 5-7
CENTER WAVELENGTH λ0=690nm
|  | MATERIAL | N | d | N·d |  |
|---|---|---|---|---|---|
| AIR | — | — | — | — |  |
| 1st LAYER (L) | MgF$_2$ | 1.3855 | 126.908 | 175.831 | (0.255 λ0) |
| 2nd LAYER (H) | sub-h4 | 2.0928 | 161.624 | 338.247 | (0.490 λ0) |
| 3rd LAYER (M) | Al$_2$O$_3$ | 1.6289 | 90.264 | 147.031 | (0.213 λ0) |
| 4th LAYER (L) | MgF$_2$ | 1.3855 | 40.000 | 55.420 | (0.080 λ0) |
| 5th LAYER (M) | Al$_2$O$_3$ | 1.6289 | 120.154 | 195.719 | (0.284 λ0) |
| 6th LAYER (H) | sub-h4 | 2.0928 | 188.970 | 395.476 | (0.573 λ0) |
| 7th LAYER (M) | Al$_2$O$_3$ | 1.6289 | 42.177 | 68.702 | (0.100 λ0) |
| 8th LAYER (H) | sub-h4 | 2.0928 | 33.735 | 70.601 | (0.102 λ0) |
| 9th LAYER (M) | Al$_2$O$_3$ | 1.6289 | 34.358 | 55.966 | (0.081 λ0) |
| OPTICAL SUBSTRATE | NBFD13 | 1.8061 | — | — |  |
FIG. 31B EXAMPLE 5-7
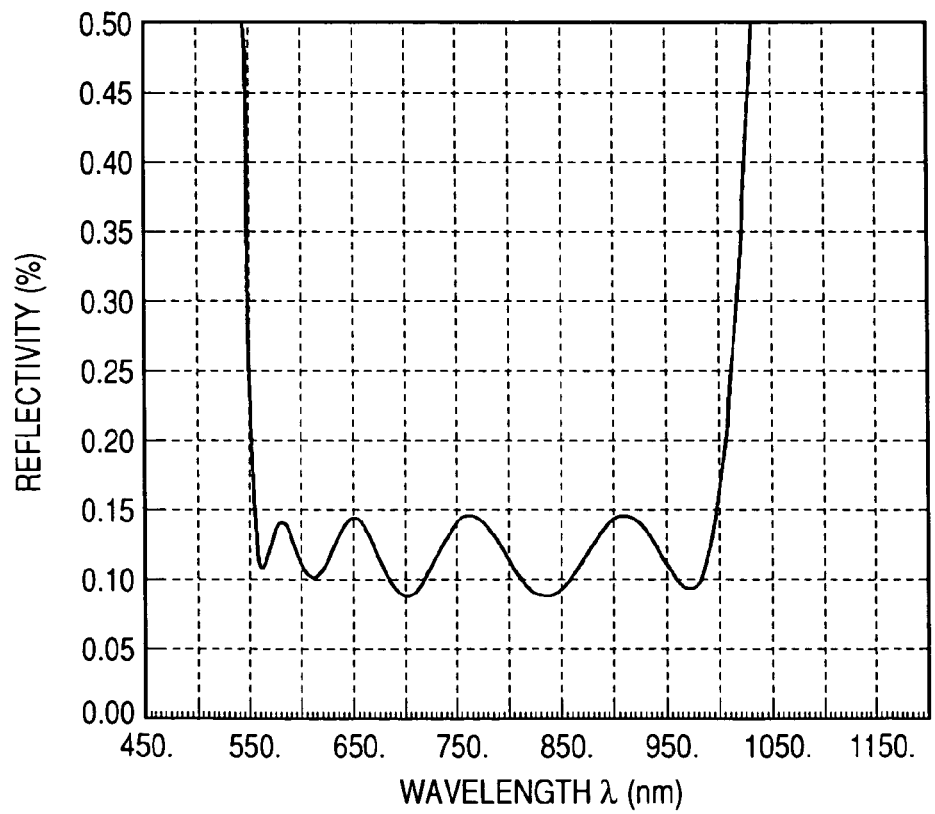

FIG. 32A EXAMPLE 5-8
CENTER WAVELENGTH λ0=690nm
|  | MATERIAL | N | d | N·d |  |
|---|---|---|---|---|---|
| AIR | — | — | — | — |  |
| 1st LAYER (L) | MgF₂ | 1.3855 | 126.944 | 175.881 | (0.255 λ0) |
| 2nd LAYER (H) | sub-h4 | 2.0928 | 161.759 | 338.529 | (0.491 λ0) |
| 3rd LAYER (M) | Al₂O₃ | 1.6289 | 89.295 | 145.453 | (0.211 λ0) |
| 4th LAYER (L) | MgF₂ | 1.3855 | 40.000 | 55.420 | (0.080 λ0) |
| 5th LAYER (M) | Al₂O₃ | 1.6289 | 120.943 | 197.004 | (0.286 λ0) |
| 6th LAYER (H) | sub-h4 | 2.0928 | 193.463 | 404.879 | (0.587 λ0) |
| 7th LAYER (M) | Al₂O₃ | 1.6289 | 38.190 | 62.208 | (0.090 λ0) |
| 8th LAYER (H) | sub-h4 | 2.0928 | 43.658 | 91.367 | (0.132 λ0) |
| 9th LAYER (M) | Al₂O₃ | 1.6289 | 29.071 | 47.354 | (0.069 λ0) |
| OPTICAL SUBSTRATE | NBFD13 | 1.8061 | — | — |  |
FIG. 32B EXAMPLE 5-8
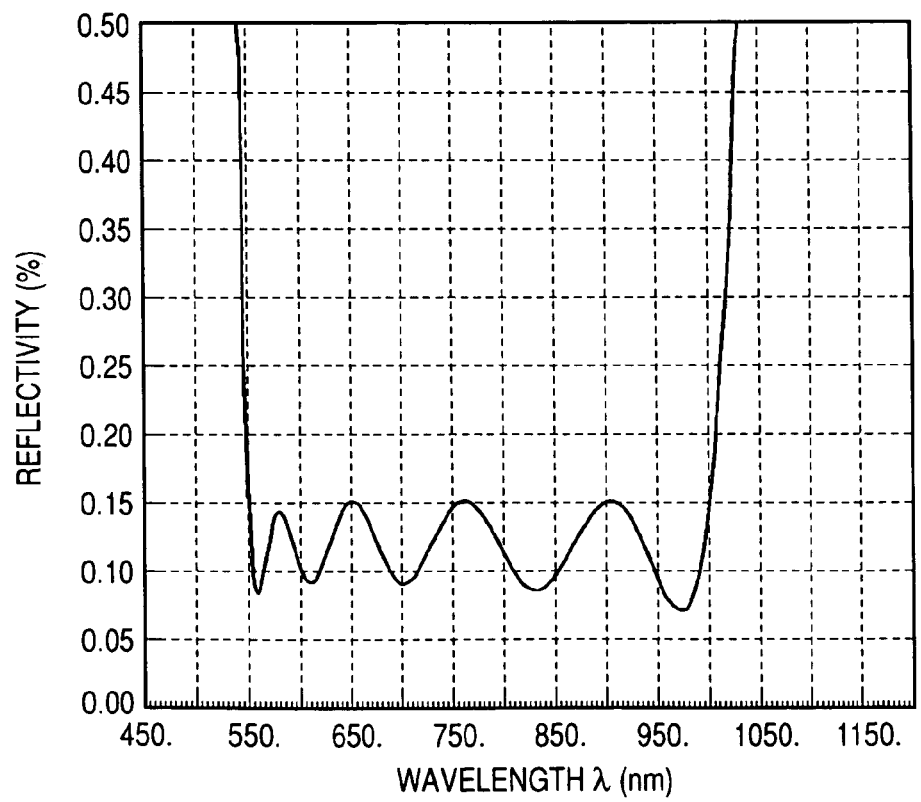

FIG. 33A EXAMPLE 6-1
CENTER WAVELENGTH λ0=480nm
|  | MATERIAL | N | d | N·d |  |
|---|---|---|---|---|---|
| AIR | — | — | — | — |  |
| 1st LAYER (L) | MgF$_2$ | 1.3855 | 90.436 | 125.299 | (0.261 λ) |
| 2nd LAYER (H) | sub-h4 | 2.0928 | 111.998 | 234.389 | (0.488 λ) |
| 3rd LAYER (M) | Al$_2$O$_3$ | 1.6289 | 64.824 | 105.592 | (0.220 λ) |
| 4th LAYER (L) | MgF$_2$ | 1.3855 | 30.000 | 41.565 | (0.087 λ) |
| 5th LAYER (M) | Al$_2$O$_3$ | 1.6289 | 82.673 | 134.666 | (0.281 λ) |
| 6th LAYER (H) | sub-h4 | 2.0928 | 124.329 | 260.196 | (0.542 λ) |
| 7th LAYER (M) | Al$_2$O$_3$ | 1.6289 | 30.583 | 49.817 | (0.104 λ) |
| 8th LAYER (H) | sub-h4 | 2.0928 | 13.255 | 27.740 | (0.058 λ) |
| OPTICAL SUBSTRATE | BASF-2 | 1.6645 | — | — |  |
FIG. 33B EXAMPLE 6-1
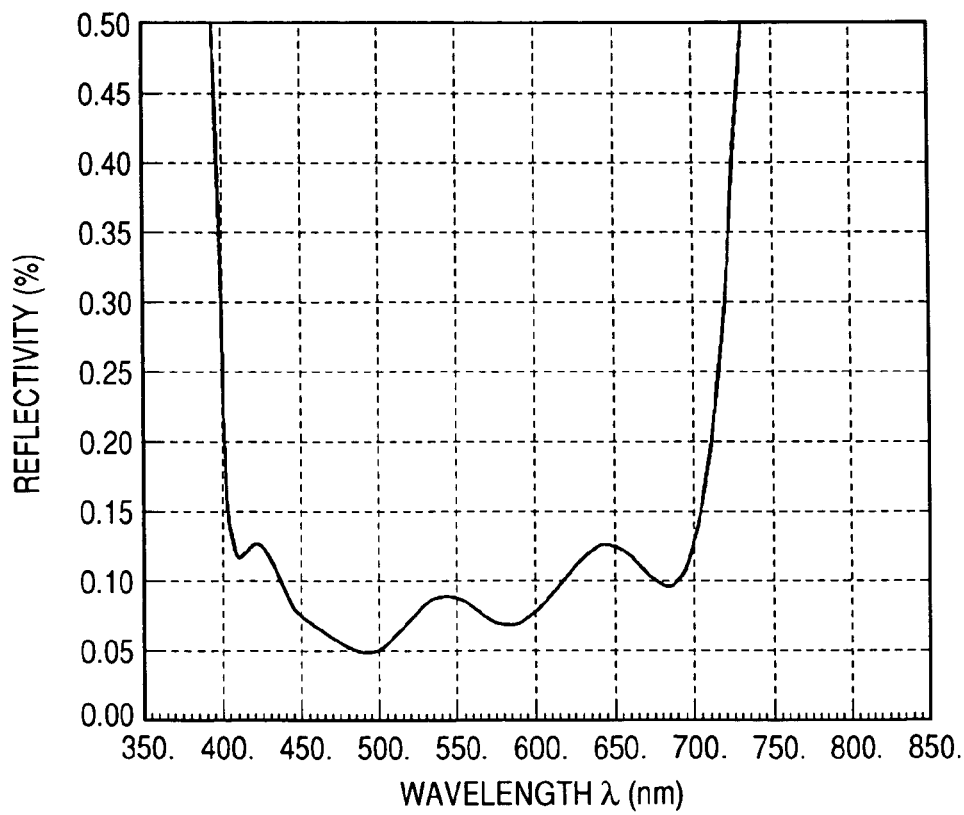

FIG. 34A EXAMPLE 6-2
CENTER WAVELENGTH λ0=480nm
|  | MATERIAL | N | d | N·d |  |
|---|---|---|---|---|---|
| AIR | — | — | — | — |  |
| 1st LAYER (L) | MgF₂ | 1.3855 | 90.601 | 125.528 | (0.262 λ0) |
| 2nd LAYER (H) | sub-h4 | 2.0928 | 111.907 | 234.199 | (0.488 λ0) |
| 3rd LAYER (M) | Al₂O₃ | 1.6289 | 64.347 | 104.815 | (0.218 λ0) |
| 4th LAYER (L) | MgF₂ | 1.3855 | 30.000 | 41.565 | (0.087 λ0) |
| 5th LAYER (M) | Al₂O₃ | 1.6289 | 83.259 | 135.621 | (0.283 λ0) |
| 6th LAYER (H) | sub-h4 | 2.0928 | 125.537 | 262.724 | (0.547 λ0) |
| 7th LAYER (M) | Al₂O₃ | 1.6289 | 26.993 | 43.969 | (0.092 λ0) |
| 8th LAYER (H) | sub-h4 | 2.0928 | 14.142 | 29.596 | (0.062 λ0) |
| OPTICAL SUBSTRATE | SF1 | 1.7174 | — | — | — |
FIG. 34B EXAMPLE 6-2
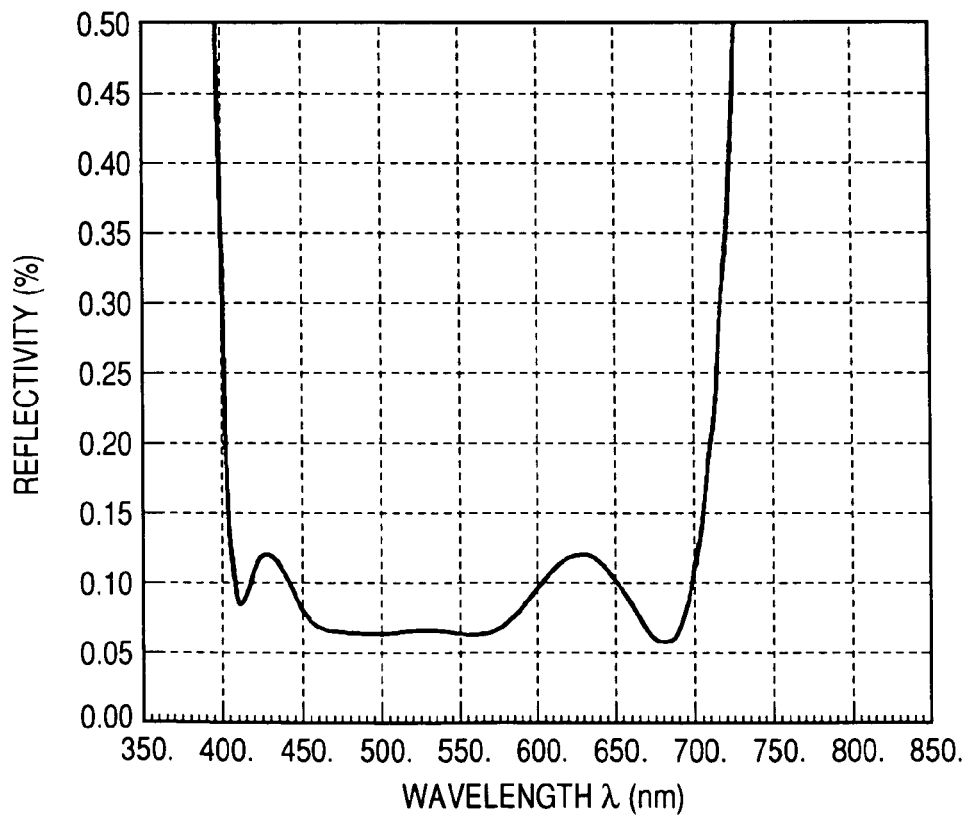

FIG. 35A EXAMPLE 6-3
CENTER WAVELENGTH λ0=480nm
|  | MATERIAL | N | d | N·d | |
|---|---|---|---|---|---|
| AIR | — | — | — | — | |
| 1st LAYER (L) | MgF₂ | 1.3855 | 90.775 | 125.769 | (0.262 λ0) |
| 2nd LAYER (H) | sub-h4 | 2.0928 | 111.858 | 234.096 | (0.488 λ0) |
| 3rd LAYER (M) | Al₂O₃ | 1.6289 | 63.502 | 103.438 | (0.215 λ0) |
| 4th LAYER (L) | MgF₂ | 1.3855 | 30.000 | 41.565 | (0.087 λ0) |
| 5th LAYER (M) | Al₂O₃ | 1.6289 | 84.081 | 136.960 | (0.285 λ0) |
| 6th LAYER (H) | sub-h4 | 2.0928 | 126.963 | 265.708 | (0.554 λ0) |
| 7th LAYER (M) | Al₂O₃ | 1.6289 | 24.224 | 39.458 | (0.082 λ0) |
| 8th LAYER (H) | sub-h4 | 2.0928 | 14.769 | 30.909 | (0.064 λ0) |
| OPTICAL SUBSTRATE | SF14 | 1.7618 | — | — | |
FIG. 35B EXAMPLE 6-3
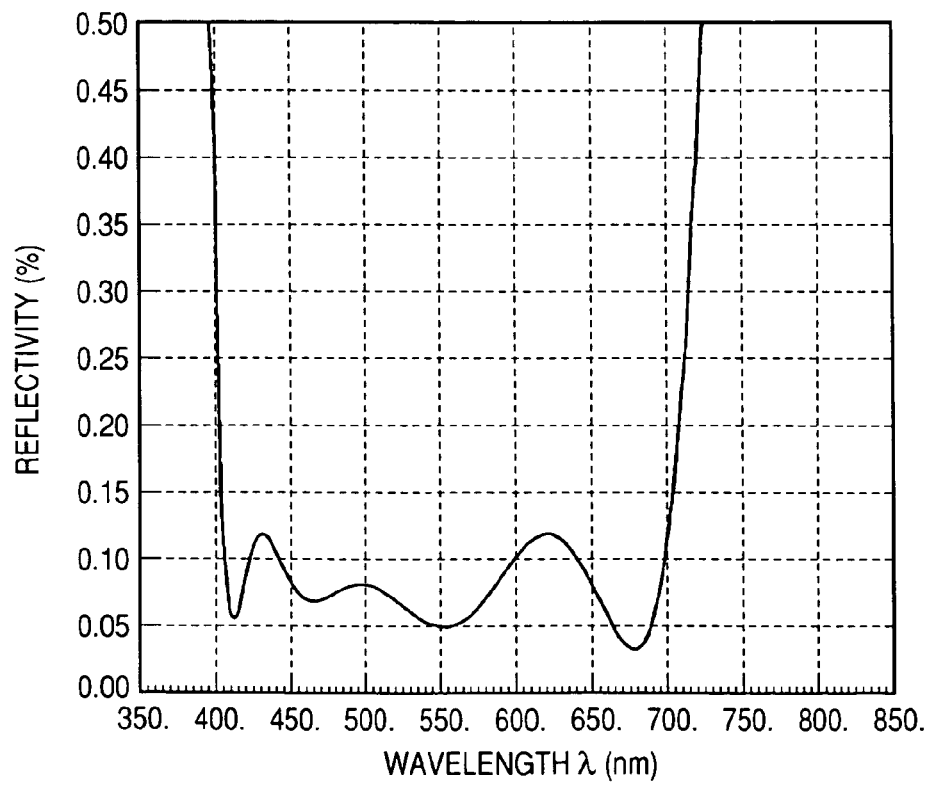

FIG. 36A EXAMPLE 7-1
CENTER WAVELENGTH λ0=480nm
|  | MATERIAL | N | d | N·d | |
|---|---|---|---|---|---|
| AIR | — | — | — | — | |
| 1st LAYER (L1) | MgF$_2$ | 1.3855 | 90.326 | 125.147 | (0.261 λ0) |
| 2nd LAYER (H) | sub-h4 | 2.0928 | 111.820 | 234.017 | (0.488 λ0) |
| 3rd LAYER (M) | Al$_2$O$_3$ | 1.6289 | 63.974 | 104.207 | (0.217 λ0) |
| 4th LAYER (L1) | MgF$_2$ | 1.3855 | 30.000 | 41.565 | (0.087 λ0) |
| 5th LAYER (M) | Al$_2$O$_3$ | 1.6289 | 82.723 | 134.747 | (0.281 λ0) |
| 6th LAYER (H) | sub-h4 | 2.0928 | 115.963 | 242.687 | (0.506 λ0) |
| 7th LAYER (M) | Al$_2$O$_3$ | 1.6289 | 12.000 | 19.547 | (0.041 λ0) |
| 8th LAYER (H) | sub-h4 | 2.0928 | 13.802 | 28.885 | (0.060 λ0) |
| 9th LAYER (L2) | SiO$_2$ | 1.4671 | 23.407 | 34.340 | (0.072 λ0) |
| 10th LAYER (H) | sub-h4 | 2.0928 | 12.000 | 25.114 | (0.052 λ0) |
| 11th LAYER (M) | Al$_2$O$_3$ | 1.6289 | 12.000 | 19.547 | (0.041 λ0) |
| OPTICAL SUBSTRATE | F-3 | 1.6129 | — | — | — |
FIG. 36B EXAMPLE 7-1
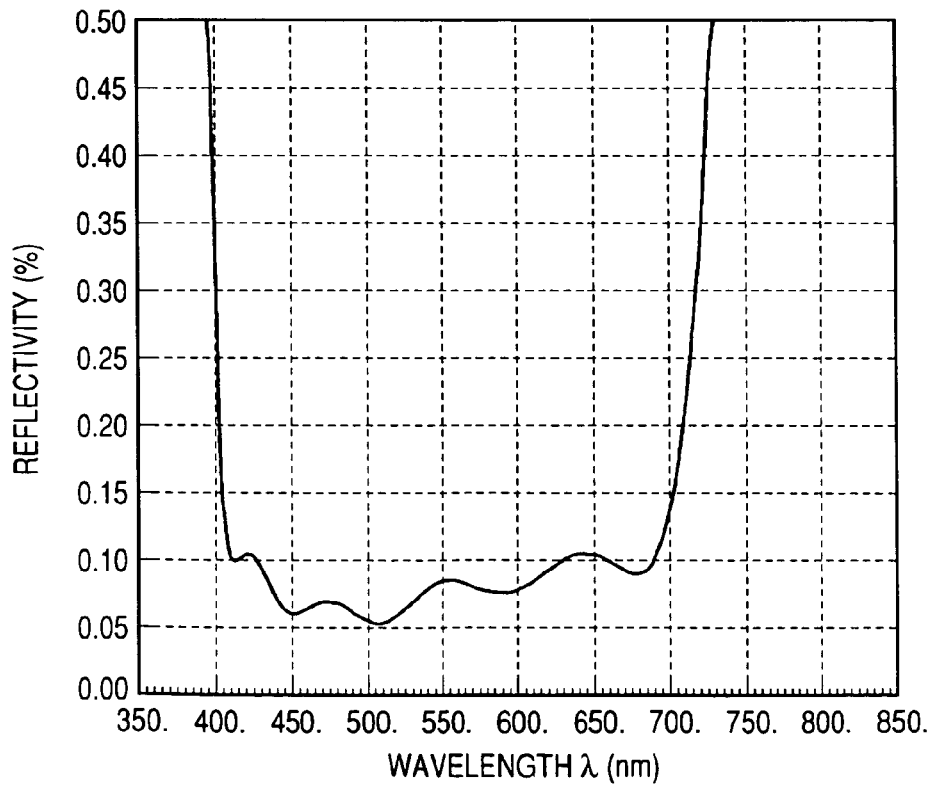

FIG. 37A EXAMPLE 7-2
CENTER WAVELENGTH λ0=480nm
|  | MATERIAL | N | d | N·d | |
|---|---|---|---|---|---|
| AIR | — | — | — | — | |
| 1st LAYER (L1) | MgF$_2$ | 1.3855 | 90.399 | 125.248 | (0.261 λ0) |
| 2nd LAYER (H) | sub-h4 | 2.0928 | 111.513 | 233.374 | (0.486 λ0) |
| 3rd LAYER (M) | Al$_2$O$_3$ | 1.6289 | 62.576 | 101.930 | (0.212 λ0) |
| 4th LAYER (L1) | MgF$_2$ | 1.3855 | 30.000 | 41.565 | (0.087 λ0) |
| 5th LAYER (M) | Al$_2$O$_3$ | 1.6289 | 82.769 | 134.822 | (0.281 λ0) |
| 6th LAYER (H) | sub-h4 | 2.0928 | 109.057 | 228.234 | (0.475 λ0) |
| 7th LAYER (M) | Al$_2$O$_3$ | 1.6289 | 12.000 | 19.547 | (0.041 λ0) |
| 8th LAYER (H) | sub-h4 | 2.0928 | 21.046 | 44.045 | (0.092 λ0) |
| 9th LAYER (L2) | SiO$_2$ | 1.4671 | 30.000 | 44.013 | (0.092 λ0) |
| 10th LAYER (H) | sub-h4 | 2.0928 | 12.000 | 25.114 | (0.052 λ0) |
| 11th LAYER (M) | Al$_2$O$_3$ | 1.6289 | 75.773 | 123.427 | (0.257 λ0) |
| OPTICAL SUBSTRATE | BASF-2 | 1.6645 | — | — | |
FIG. 37B EXAMPLE 7-2
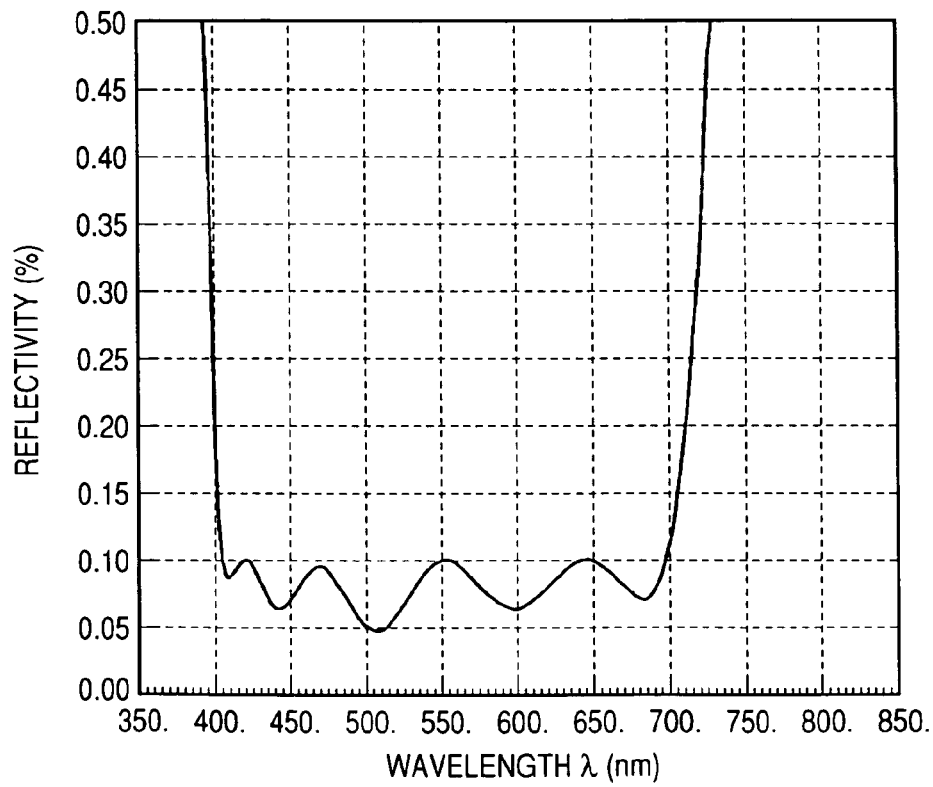

FIG. 38A EXAMPLE 7-3

CENTER WAVELENGTH $\lambda 0$=480nm

| | MATERIAL | N | d | N·d | |
|---|---|---|---|---|---|
| AIR | — | — | — | — | |
| 1st LAYER (L1) | MgF$_2$ | 1.3855 | 90.452 | 125.321 | (0.261 $\lambda$0) |
| 2nd LAYER (H) | sub-h4 | 2.0928 | 111.423 | 233.186 | (0.486 $\lambda$0) |
| 3rd LAYER (M) | Al$_2$O$_3$ | 1.6289 | 60.670 | 98.825 | (0.206 $\lambda$0) |
| 4th LAYER (L1) | MgF$_2$ | 1.3855 | 30.000 | 41.565 | (0.087 $\lambda$0) |
| 5th LAYER (M) | Al$_2$O$_3$ | 1.6289 | 83.067 | 135.308 | (0.282 $\lambda$0) |
| 6th LAYER (H) | sub-h4 | 2.0928 | 99.797 | 208.855 | (0.435 $\lambda$0) |
| 7th LAYER (M) | Al$_2$O$_3$ | 1.6289 | 13.144 | 21.410 | (0.045 $\lambda$0) |
| 8th LAYER (H) | sub-h4 | 2.0928 | 26.263 | 54.963 | (0.115 $\lambda$0) |
| 9th LAYER (L2) | SiO$_2$ | 1.4671 | 38.237 | 56.098 | (0.117 $\lambda$0) |
| 10th LAYER (H) | sub-h4 | 2.0928 | 12.000 | 25.114 | (0.052 $\lambda$0) |
| 11th LAYER (M) | Al$_2$O$_3$ | 1.6289 | 71.932 | 117.170 | (0.244 $\lambda$0) |
| OPTICAL SUBSTRATE | SF1 | 1.7174 | — | — | |

FIG. 38B EXAMPLE 7-3

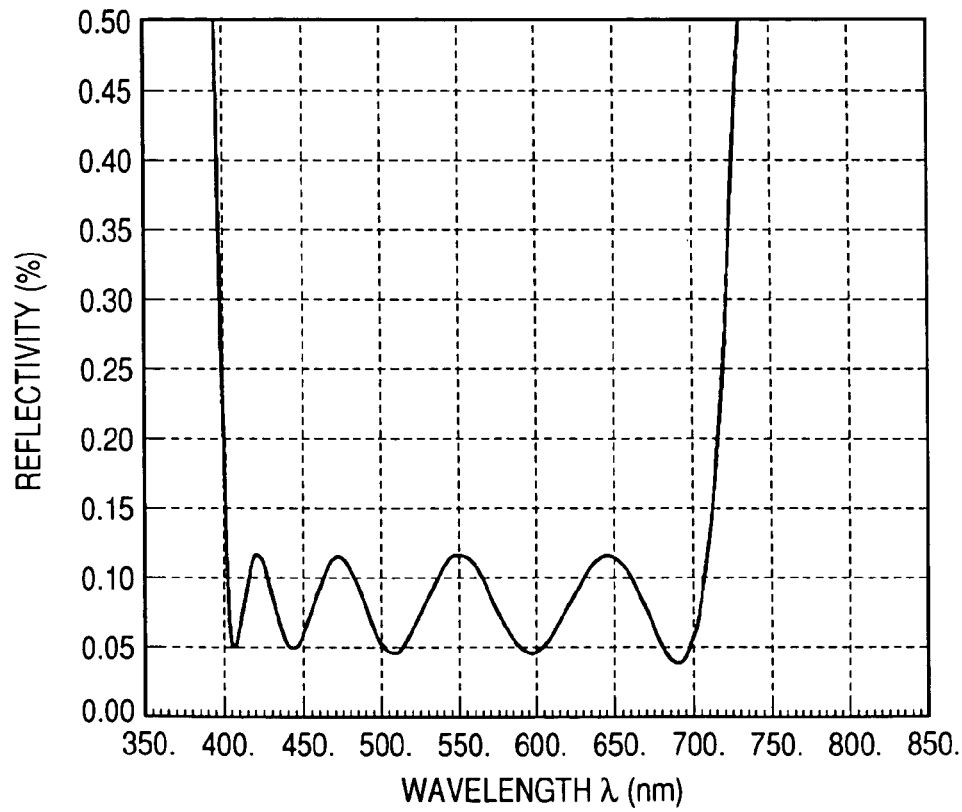

FIG. 39A EXAMPLE 8-1
CENTER WAVELENGTH λ0=480nm
|  | MATERIAL | N | d | N·d | |
|---|---|---|---|---|---|
| AIR | — | — | — | — | |
| 1st LAYER (L1) | MgF₂ | 1.3855 | 90.412 | 125.266 | (0.261 λ0) |
| 2nd LAYER (H) | sub-h4 | 2.0928 | 111.798 | 233.971 | (0.487 λ0) |
| 3rd LAYER (M) | Al₂O₃ | 1.6289 | 62.335 | 101.537 | (0.212 λ0) |
| 4th LAYER (L1) | MgF₂ | 1.3855 | 28.000 | 38.794 | (0.081 λ0) |
| 5th LAYER (M) | Al₂O₃ | 1.6289 | 83.414 | 135.873 | (0.283 λ0) |
| 6th LAYER (H) | sub-h4 | 2.0928 | 104.362 | 218.409 | (0.455 λ0) |
| 7th LAYER (M) | Al₂O₃ | 1.6289 | 11.000 | 17.918 | (0.037 λ0) |
| 8th LAYER (H) | sub-h4 | 2.0928 | 24.102 | 50.441 | (0.105 λ0) |
| 9th LAYER (L2) | SiO₂ | 1.4671 | 36.752 | 53.919 | (0.112 λ0) |
| 10th LAYER (H) | sub-h4 | 2.0928 | 16.529 | 34.592 | (0.072 λ0) |
| 11th LAYER (L2) | SiO₂ | 1.4671 | 28.000 | 41.079 | (0.086 λ0) |
| OPTICAL SUBSTRATE | F-3 | 1.6129 | — | — | |
FIG. 39B EXAMPLE 8-1
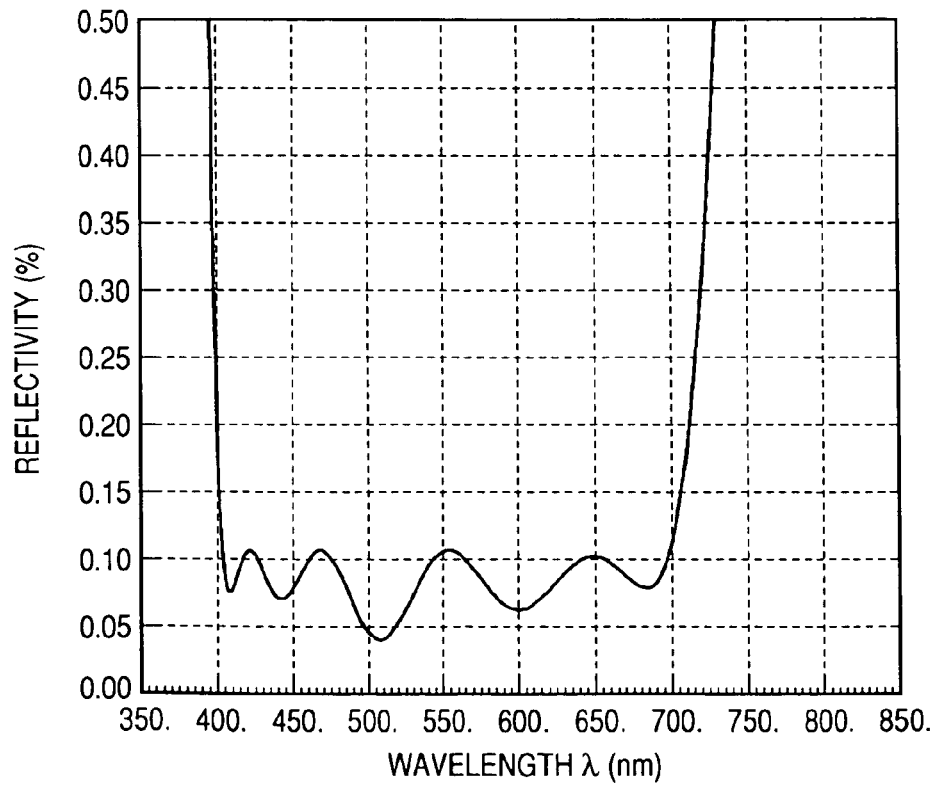

FIG. 40A EXAMPLE 8-2
CENTER WAVELENGTH λ0=480nm
|  | MATERIAL | N | d | N·d | |
|---|---|---|---|---|---|
| AIR | — | — | — | — | |
| 1st LAYER (L1) | MgF$_2$ | 1.3855 | 90.457 | 125.328 | (0.261 λ0) |
| 2nd LAYER (H) | sub-h4 | 2.0928 | 111.847 | 234.073 | (0.488 λ0) |
| 3rd LAYER (M) | Al$_2$O$_3$ | 1.6289 | 61.454 | 100.102 | (0.209 λ0) |
| 4th LAYER (L1) | MgF$_2$ | 1.3855 | 28.000 | 38.794 | (0.081 λ0) |
| 5th LAYER (M) | Al$_2$O$_3$ | 1.6289 | 83.968 | 136.775 | (0.285 λ0) |
| 6th LAYER (H) | sub-h4 | 2.0928 | 103.702 | 217.028 | (0.452 λ0) |
| 7th LAYER (M) | Al$_2$O$_3$ | 1.6289 | 11.000 | 17.918 | (0.037 λ0) |
| 8th LAYER (H) | sub-h4 | 2.0928 | 25.779 | 53.950 | (0.112 λ0) |
| 9th LAYER (L2) | SiO$_2$ | 1.4671 | 36.809 | 54.002 | (0.113 λ0) |
| 10th LAYER (H) | sub-h4 | 2.0928 | 18.746 | 39.232 | (0.082 λ0) |
| 11th LAYER (L2) | SiO$_2$ | 1.4671 | 28.000 | 41.079 | (0.086 λ0) |
| OPTICAL SUBSTRATE | BASF-2 | 1.6645 | — | — | |
FIG. 40B EXAMPLE 8-2
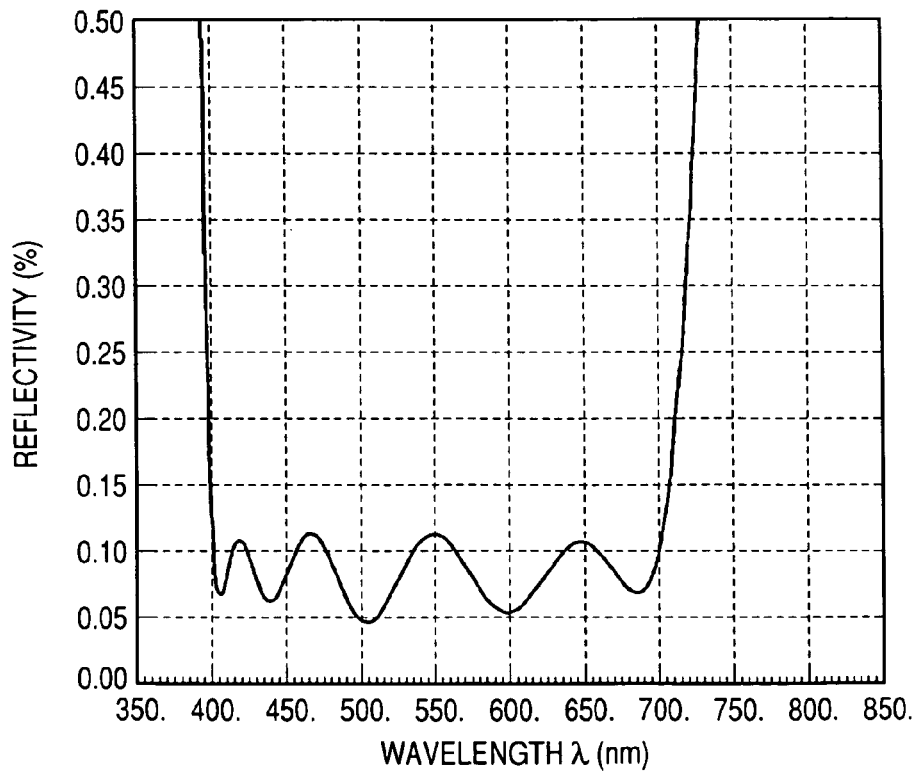

ANTIREFLECTION FILM

BACKGROUND OF THE INVENTION

1. Technical Field

The present invention relates to an antireflection film which is formed on one face of an optical component such as a lens or a filter to produce an antireflective effect on light of a predetermined wavelength band.

2. Description of the Related Art

In an imaging apparatus such as a photographic camera or a broadcast camera, usually, many optical components such as lenses, prisms, and filters are arranged along the optical path. When light is incident on the surface of such an optical component, part of the light is formed as reflected light. When the total number of the optical components is large, the total amount of reflected light is correspondingly increased, and hence problems such as flare or ghost are caused in, for example, a broadcast camera. The reflectivities at the surfaces of the optical components are distributed with respect to the wavelength of the incident light, and show various wavelength dependences according to the constituent materials of the optical components. Therefore, the chromaticity balance is impaired, and the white balance must be adjusted in the whole imaging apparatus.

To comply with this, conventionally, an antireflection film is disposed on the surface of each optical component.

An antireflection film is a multilayer film formed by a combination of dielectric films having different refractive indices. For example, antireflection films are disclosed in JP 2002-107506 A, JP 2001-100002 A and JP 2002-267801 A.

In the antireflection films disclosed in JP 2002-107506 A, JP 2001-100002 A and JP 2002-267801 A, however, the reflectivities in the vicinities of the upper and lower limit (i.e., the vicinities of 400 nm and 700 nm) of the wavelength band which is usually deemed as the visible light region tend to be slightly impaired. For example, a wavelength band in which the reflectivity is 0.15% or less is limited to a width of about 280 nm. Therefore, an antireflection film which can exhibit an excellent light transmittance in a broader wavelength band is requested.

SUMMARY

The invention has been made in view of the above circumstances and provides an antireflection film which exhibits a lower reflectivity in a broader wavelength band.

According to an aspect of the invention, an antireflection film is disposed on a substrate. The antireflection film includes first to eighth layers that are stacked sequentially from an opposite side to the substrate. The first and fourth layers are made of a low-refractive index material exhibiting a refractive index of 1.35 to 1.50 with respect to the d-line. The third and fifth layers are made of an intermediate-refractive index material exhibiting a refractive index of 1.55 to 1.85 with respect to the d-line. The second and sixth layers are made of a high-refractive index material exhibiting a refractive index that is in a range from 1.70 to 2.50 with respect to the d-line, and that is higher than the refractive index of the intermediate-refractive index material.

According to the above configuration, the antireflection film includes at least the first to eighth layers which are arranged from the opposite side to the substrate, and the first to sixth layers are made of the material exhibiting the predetermined refractive index. Therefore, the reflectivity distribution is sufficiently reduced in a broader wavelength band.

The antireflection film may satisfy the following conditional expressions (1) to (6):

$$0.25 \times \lambda 0 \leq N1 \cdot d1 \leq 0.27 \times \lambda 0 \tag{1}$$

$$0.48 \times \lambda 0 \leq N2 \cdot d2 \leq 0.50 \times \lambda 0 \tag{2}$$

$$0.20 \times \lambda 0 \leq N3 \cdot d3 \leq 0.23 \times \lambda 0 \tag{3}$$

$$0.08 \times \lambda 0 \leq N4 \cdot d4 \leq 0.09 \times \lambda 0 \tag{4}$$

$$0.27 \times \lambda 0 \leq N5 \cdot d5 \leq 0.30 \times \lambda 0 \tag{5}$$

$$0.41 \times \lambda 0 \leq N6 \cdot d6 \leq 0.60 \times \lambda 0 \tag{6}$$

where $\lambda 0$: center wavelength,

N1 to N6: refractive indices of the first to sixth layers with respect to the center wavelength $\lambda 0$, and d1 to d6: physical thicknesses of the first to sixth layers.

Also, the seventh layer may be made of the intermediate-refractive index material. The eighth layer may be made of the high-refractive index material.

Also, the antireflection film may further include ninth and tenth layers, which are stacked sequentially on a substrate side of the eighth layer. The ninth layer is made of the low-refractive index material. The tenth layer is made of the intermediate-refractive index material. In this case, the antireflection film may satisfy the following conditional expressions (7) to (10):

$$0.03 \times \lambda 0 \leq N7 \cdot d7 \leq 0.13 \times \lambda 0 \tag{7}$$

$$0.05 \times \lambda 0 \leq N8 \cdot d8 \leq 0.11 \times \lambda 0 \tag{8}$$

$$0.08 \times \lambda 0 \leq N9 \cdot d9 \leq 0.09 \times \lambda 0 \tag{9}$$

$$0.09 \times \lambda 0 \leq N10 \cdot d10 \leq 0.14 \times \lambda 0 \tag{10}$$

where $\lambda 0$: center wavelength,

N7 to N10: refractive indices of the seventh and tenth layers with respect to the center wavelength $\lambda 0$, and d7 to d10: physical thicknesses of the seventh to tenth layers.

Also, the antireflection film may further include ninth and tenth layers, which are stacked sequentially on a substrate side of the eighth layer. The ninth layer is made of the low-refractive index material. The tenth layer is made of the high-refractive index material. In this case, the antireflection film may satisfy the following conditional expressions (11) to (13):

$$0.03 \times \lambda 0 \leq N7 \cdot d7 \leq 0.04 \times \lambda 0 \tag{11}$$

$$0.06 \times \lambda 0 \leq N8 \cdot d8 \leq 0.11 \times \lambda 0 \tag{12}$$

$$0.08 \times \lambda 0 \leq N9 \cdot d9 \leq 0.14 \times \lambda 0 \tag{13}$$

$$0.04 \times \lambda 0 \leq N10 \cdot d10 \leq 0.10 \times \lambda 0 \tag{14}$$

where $\lambda 0$: center wavelength,

N7 to N10: refractive indices of the seventh and tenth layers with respect to the center wavelength $\lambda 0$, and d7 to d10: physical thicknesses of the seventh to tenth layers.

Also, the antireflection film may further include ninth and twelfth layers, which are stacked sequentially on a substrate side of the eighth layer. The ninth layer is made of the low-refractive index material. The tenth layer is made of the high-refractive index material. The eleventh layer is made of the low-refractive index material. The twelfth layer is made of the high-refractive index material.

In this case, the antireflection film may satisfy the following conditional expressions (15) to (20):

$$0.03 \times \lambda 0 \leq N7 \cdot d7 \leq 0.04 \times \lambda 0 \qquad (15)$$

$$0.10 \times \lambda 0 \leq N8 \cdot d8 \leq 0.12 \times \lambda 0 \qquad (16)$$

$$0.10 \times \lambda 0 \leq N9 \cdot d9 \leq 0.11 \times \lambda 0 \qquad (17)$$

$$0.10 \times \lambda 0 \leq N10 \cdot d10 \leq 0.11 \times \lambda 0 \qquad (18)$$

$$0.13 \times \lambda 0 \leq N11 \cdot d11 \leq 0.16 \times \lambda 0 \qquad (19)$$

$$0.04 \times \lambda 0 \leq N12 \cdot d12 \leq 0.05 \times \lambda 0 \qquad (20)$$

where
$\lambda 0$: center wavelength,
N7 to N12: refractive indices of the seventh to twelfth layers with respect to the center wavelength $\lambda 0$, and
d7 to d12: physical thicknesses of the seventh to twelfth layers.

Also, the antireflection film may further include ninth and tenth layers, which are stacked sequentially on a substrate side of the eighth layer. The ninth layer is made of the intermediate-refractive index material. The tenth layer is made of the high-refractive index material. In this case, the antireflection film may satisfy the following conditional expressions (21) to (24):

$$0.08 \times \lambda 0 \leq N7 \cdot d7 \leq 0.12 \times \lambda 0 \qquad (21)$$

$$0.11 \times \lambda 0 \leq N8 \cdot d8 \leq 0.17 \times \lambda 0 \qquad (22)$$

$$0.07 \times \lambda 0 \leq N9 \cdot d9 \leq 0.18 \times \lambda 0 \qquad (23)$$

$$0.04 \times \lambda 0 \leq N10 \cdot d10 \leq 0.09 \times \lambda 0 \qquad (24)$$

where
$\lambda 0$: center wavelength,
N7 to N10: refractive indices of the seventh to tenth layers with respect to the center wavelength $\lambda 0$, and
d7 to d10: physical thicknesses of the seventh to tenth layers.

Also, the antireflection film may further include a ninth layer stacked on a substrate side of the eighth layer. The ninth layer is made of the intermediate-refractive index material. In this case, the antireflection film may satisfy the following conditional expressions (25) to (27):

$$0.08 \times \lambda 0 \leq N7 \cdot d7 \leq 0.12 \times \lambda 0 \qquad (25)$$

$$0.07 \times \lambda 0 \leq N8 \cdot d8 \leq 0.155 \times \lambda 0 \qquad (26)$$

$$0.06 \times \lambda 0 \leq N9 \cdot d9 \leq 0.12 \times \lambda 0 \qquad (27)$$

where
$\lambda 0$: center wavelength,
N7 to N9: refractive indices of the seventh to ninth layers with respect to the center wavelength $\lambda 0$, and
d7 to d9: physical thicknesses of the seventh and ninth layers.

Also, the antireflection film may consist only of the first to eighth layers. In this case, the antireflection film may satisfy the following conditional expressions (28) and (29):

$$0.08 \times \lambda 0 \leq N7 \cdot d7 \leq 0.11 \times \lambda 0 \qquad (28)$$

$$0.05 \times \lambda 0 \leq N8 \cdot d8 \leq 0.07 \times \lambda 0 \qquad (29)$$

where
$\lambda 0$: center wavelength,
N7 and N8: refractive indices of the seventh and eighth layers with respect to the center wavelength $\lambda 0$, and
d7 and d8: physical thicknesses of the seventh and eighth layers.

Also, the antireflection film may further include ninth to eleventh layers, which are sequentially stacked on a substrate side of the eighth layer. The ninth layer is made of the low-refractive index material. The tenth layer is made of the high-refractive index material. The eleventh layer is made of the intermediate-refractive index material.

In this case, the antireflection film may satisfy the following conditional expressions (30) to (34):

$$0.04 \times \lambda 0 \leq N7 \cdot d7 \leq 0.05 \times \lambda 0 \qquad (30)$$

$$0.06 \times \lambda 0 \leq N8 \cdot d8 \leq 0.12 \times \lambda 0 \qquad (31)$$

$$0.07 \times \lambda 0 \leq N9 \cdot d9 \leq 0.12 \times \lambda 0 \qquad (32)$$

$$0.05 \times \lambda 0 \leq N10 \cdot d10 \leq 0.06 \times \lambda 0 \qquad (33)$$

$$0.04 \times \lambda 0 \leq N11 \cdot d11 \leq 0.26 \times \lambda 0 \qquad (34)$$

where
$\lambda 0$: center wavelength,
N7 to N11: refractive indices of the seventh to eleventh layers with respect to the center wavelength $\lambda 0$, and
d7 and d11: physical thicknesses of the seventh to eleventh layers.

Also, the antireflection film may further include ninth to eleventh layers, which are subsequently stacked on a substrate side of the eighth layer. The ninth layer is made of the low-refractive index material. The tenth layer is made of the high-refractive index material. The eleventh layer is made of the low-refractive index material. In this case, the antireflection film may satisfy the following conditional expressions (35) to (39):

$$0.03 \times \lambda 0 \leq N7 \cdot d7 \leq 0.04 \times \lambda 0 \qquad (35)$$

$$0.10 \times \lambda 0 \leq N8 \cdot d8 \leq 0.12 \times \lambda 0 \qquad (36)$$

$$0.11 \times \lambda 0 \leq N9 \cdot d9 \leq 0.12 \times \lambda 0 \qquad (37)$$

$$0.07 \times \lambda 0 \leq N10 \cdot d10 \leq 0.09 \times \lambda 0 \qquad (38)$$

$$0.08 \times \lambda 0 \leq N11 \cdot d11 \leq 0.09 \times \lambda 0 \qquad (39)$$

where
$\lambda 0$: center wavelength,
N7 to N11: refractive indices of the seventh to eleventh layers with respect to the center wavelength $\lambda 0$, and
d7 to d11: physical thicknesses of the seventh and eleventh layers.

The antireflection film according to any of the above configurations is disposed on the substrate, and includes at least first to eighth layers stacked sequentially from the opposite side to the substrate. The first and fourth layers exhibit the refractive index of 1.35 to 1.50 with respect to the d-line. The third and fifth layers exhibit the refractive index of 1.55 to 1.85 with respect to the d-line. The second and sixth layers exhibit the refractive index that is in a range from 1.70 to 2.50 with respect to the d-line, and that is higher than the refractive indices of the third and fifth layers. Although the number of stacked layers is relatively small, therefore, the reflectivity can be sufficiently reduced in a broader wavelength band. When such an antireflection film is applied to an optical system in an imaging apparatus such as a photographic cam-

BRIEF DESCRIPTION OF THE DRAWINGS

FIG. 9 is a view showing basic data and reflectivity distribution of Example 1-1 corresponding to the antireflection film shown in FIG. 1.

FIG. 10 is a view showing basic data and reflectivity distribution of Example 1-2 corresponding to the antireflection film shown in FIG. 1.

FIG. 11 is a view showing basic data and reflectivity distribution of Example 2-1 corresponding to the antireflection film shown in FIG. 2.

FIG. 12 is a view showing basic data and reflectivity distribution of Example 2-2 corresponding to the antireflection film shown in FIG. 2.

FIG. 13 is a view showing basic data and reflectivity distribution of Example 2-3 corresponding to the antireflection film shown in FIG. 2.

FIG. 14 is a view showing basic data and reflectivity distribution of Example 2-4 corresponding to the antireflection film shown in FIG. 2.

FIG. 15 is a view showing basic data and reflectivity distribution of Example 2-5 corresponding to the antireflection film shown in FIG. 2.

FIG. 16 is a view showing basic data and reflectivity distribution of Example 2-6 corresponding to the antireflection film shown in FIG. 2.

FIG. 17 is a view showing basic data and reflectivity distribution of Example 2-7 corresponding to the antireflection film shown in FIG. 2.

FIG. 18 is a view showing basic data and reflectivity distribution of Example 2-8 corresponding to the antireflection film shown in FIG. 2.

FIG. 19 is a view showing basic data and reflectivity distribution of Example 3-1 corresponding to the antireflection film shown in FIG. 3.

FIG. 20 is a view showing basic data and reflectivity distribution of Example 3-2 corresponding to the antireflection film shown in FIG. 3.

FIG. 21 is a view showing basic data and reflectivity distribution of Example 4-1 corresponding to the antireflection film shown in FIG. 4.

FIG. 22 is a view showing basic data and reflectivity distribution of Example 4-2 corresponding to the antireflection film shown in FIG. 4.

FIG. 23 is a view showing basic data and reflectivity distribution of Example 4-3 corresponding to the antireflection film shown in FIG. 4.

FIG. 24 is a view showing basic data and reflectivity distribution of Example 4-4 corresponding to the antireflection film shown in FIG. 4.

FIG. 25 is a view showing basic data and reflectivity distribution of Example 5-1 corresponding to the antireflection film shown in FIG. 5.

FIG. 26 is a view showing basic data and reflectivity distribution of Example 5-2 corresponding to the antireflection film shown in FIG. 5.

FIG. 27 is a view showing basic data and reflectivity distribution of Example 5-3 corresponding to the antireflection film shown in FIG. 5.

FIG. 28 is a view showing basic data and reflectivity distribution of Example 5-4 corresponding to the antireflection film shown in FIG. 5.

FIG. 29 is a view showing basic data and reflectivity distribution of Example 5-5 corresponding to the antireflection film shown in FIG. 5.

FIG. 30 is a view showing basic data and reflectivity distribution of Example 5-6 corresponding to the antireflection film shown in FIG. 5.

FIG. 31 is a view showing basic data and reflectivity distribution of Example 5-7 corresponding to the antireflection film shown in FIG. 5.

FIG. 32 is a view showing basic data and reflectivity distribution of Example 5-8 corresponding to the antireflection film shown in FIG. 5.

FIG. 33 is a view showing basic data and reflectivity distribution of Example 6-1 corresponding to the antireflection film shown in FIG. 6.

FIG. 34 is a view showing basic data and reflectivity distribution of Example 6-2 corresponding to the antireflection film shown in FIG. 6.

FIG. 35 is a view showing basic data and reflectivity distribution of Example 6-3 corresponding to the antireflection film shown in FIG. 6.

FIG. 36 is a view showing basic data and reflectivity distribution of Example 7-1 corresponding to the antireflection film shown in FIG. 7.

FIG. 37 is a view showing basic data and reflectivity distribution of Example 7-2 corresponding to the antireflection film shown in FIG. 7.

FIG. 38 is a view showing basic data and reflectivity distribution of Example 7-3 corresponding to the antireflection film shown in FIG. 7.

FIG. 39 is a view showing basic data and reflectivity distribution of Example 8-1 corresponding to the antireflection film shown in FIG. 8.

FIG. 40 is a view showing basic data and reflectivity distribution of Example 8-2 corresponding to the antireflection film shown in FIG. 8.

DETAILED DESCRIPTION OF EMBODIMENTS OF THE INVENTION

Hereinafter, several embodiments of the invention will be described in detail with reference to the accompanying drawings.

First Embodiment

Figure 1:
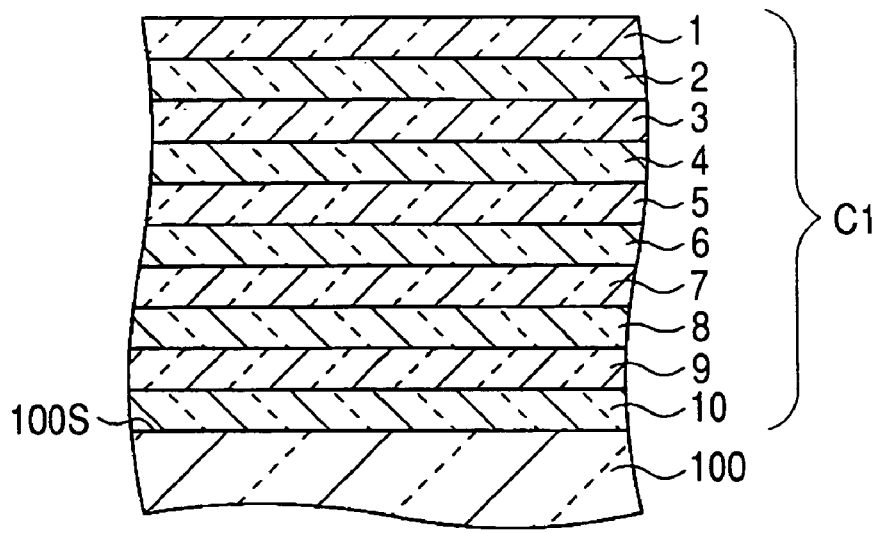
FIG. 1 is a section view of an antireflection film according to a first embodiment of the invention.

FIG. 1 is a schematic section view showing the configuration of an antireflection film C1 according to a first embodiment of the invention. The antireflection film C1 of FIG. 1 corresponds to a first numerical example (FIGS. 9 and 10) which will be described later.

The antireflection film C1 is a multilayer film which is disposed on the surface 100S of an optical substrate 100, and which consists of ten layers in total, that is, first to tenth layers 1 to 10 that are stacked sequentially from the opposite side to the optical substrate 100. In the embodiment, the surface 100S is a flat face. The invention is not limited to this, and the surface may be a curved face. Namely, a lens having a spherical surface or an aspherical surface may be used as the optical substrate 100, and the antireflection film C1 may be disposed on the spherical or aspherical surface.

The optical substrate 100 is made of a transparent material such as glass or a crystal material. Specifically, calcium fluoride ($CaF_2$), silicon dioxide ($SiO_2$), BK7 (SCHOTT AG, Germany), LF1 (SCHOTT AG, Germany), or the like which exhibits a refractive index of 1.43 to 1.58 with respect to the d-line (wavelength $\lambda$=587.56 nm).

The first layer 1, the fourth layer 4, and the ninth layer 9 are low-refractive index layers made of a low-refractive index material exhibiting a refractive index of 1.35 to 1.50 with respect to the d-line. Preferably, the first layer 1 and the fourth layer 4 are particularly made of a low-refractive index material exhibiting a refractive index of 1.38 to 1.39 with respect to the d-line, and the ninth layer 9 is particularly made of a low-refractive index material exhibiting a refractive index of 1.46 to 1.47 with respect to the d-line. The third layer 3, the fifth layer 5, the seventh layer 7, and the tenth layer 10 are intermediate-refractive index layers made of an intermediate-refractive index material exhibiting a refractive index of 1.55 to 1.85, particularly, of 1.62 to 1.63 with respect to the d-line. The second layer 2, the sixth layer 6, and the eighth layer 8 are high-refractive index layers made of a high-refractive index material exhibiting a refractive index that is in a range from 1.70 to 2.50, particularly, in a range from 2.09 to 2.10 with respect to the d-line, and that is higher than the refractive index of the intermediate-refractive index material.

As the low-refractive index material, for example, magnesium fluoride ($MgF_2$), $SiO_2$, and aluminum fluoride ($AlF_3$), and mixtures and compounds thereof can be used. In the embodiment, it is particularly preferable that $MgF_2$ is used in the first layer 1 and the fourth layer 4, and $SiO_2$ is used in the ninth layer 9. As the intermediate-refractive index material, aluminum oxide ($Al_2O_3$), germanium oxide ($GeO_2$), and yttrium oxide ($Y_2O_3$), and mixtures and compounds thereof can be used. As the high-refractive index material, lanthanum titanate ($LaTiO_3$), zirconium oxide ($ZrO_2$), titanium oxide ($TiO_2$), tantalum oxide ($Ta_2O_5$), niobium oxide ($Nb_2O_5$), hafnium oxide ($HfO_2$), and cerium oxide ($CeO_2$), and mixtures and compounds thereof can be used.

Preferably, the first to sixth layers 1 to 6 are configured so as to satisfy all of the following conditional expressions (1) to (6). In the expressions, $\lambda 0$ is the center wavelength (unit: nm), N1 to N6 are the refractive indices of the first to sixth layers 1 to 6 with respect to the center wavelength $\lambda 0$, and d1 to d6 are the physical thicknesses of the first to sixth layers 1 to 6 (unit: nm).

$$0.25 \times \lambda 0 \leq N1 \cdot d1 \leq 0.27 \times \lambda 0 \quad (1)$$

$$0.48 \times \lambda 0 \leq N2 \cdot d2 \leq 0.50 \times \lambda 0 \quad (2)$$

$$0.20 \times \lambda 0 \leq N3 \cdot d3 \leq 0.23 \times \lambda 0 \quad (3)$$

$$0.08 \times \lambda 0 \leq N4 \cdot d4 \leq 0.09 \times \lambda 0 \quad (4)$$

$$0.27 \times \lambda 0 \leq N5 \cdot d5 \leq 0.30 \times \lambda 0 \quad (5)$$

$$0.41 \times \lambda 0 \leq N6 \cdot d6 \leq 0.60 \times \lambda 0 \quad (6)$$

Preferably, the seventh to tenth layers 7 to 10 are configured so as to satisfy all of the following conditional expressions (7) to (10). In the expressions, N7 to N10 are the refractive indices of the seventh to tenth layers 7 to 10 with respect to the center wavelength $\lambda 0$, and d7 to d10 are the physical thicknesses of the seventh to tenth layers 7 to 10 (unit: nm).

$$0.03 \times \lambda 0 \leq N7 \cdot d7 \leq 0.13 \times \lambda 0 \quad (7)$$

$$0.05 \times \lambda 0 \leq N8 \cdot d8 \leq 0.11 \times \lambda 0 \quad (8)$$

$$0.08 \times \lambda 0 \leq N9 \cdot d9 \leq 0.09 \times \lambda 0 \quad (9)$$

$$0.09 \times \lambda 0 \leq N10 \cdot d10 \leq 0.14 \times \lambda 0 \quad (10)$$

In the antireflection film C1 of the embodiment, as described above, the first to tenth layers 1 to 10 which exhibit refractive indices in the predetermined ranges, respectively are stacked sequentially starting at the side (i.e., the air side) opposite to the optical substrate 100.

Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (10), whereby the above-mentioned effects can be further enhanced. When the antireflection film C1 is applied to an optical system in a photographic camera or a broadcast camera, therefore, reflection of incident light is reduced, whereby generations of flare and ghost can be suppressed, and a more excellent chromaticity balance property can be obtained.

Second Embodiment

Figure 2:
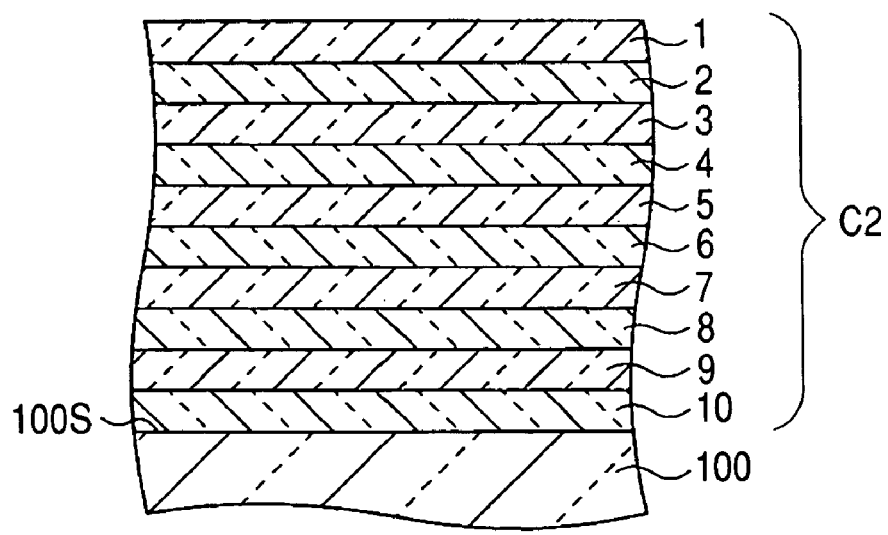
FIG. 2 is a section view of an antireflection film according to a second embodiment of the invention.

FIG. 2 is a schematic section view showing the configuration of an antireflection film C2 according to a second embodiment of the invention. The antireflection film C2 of FIG. 2 corresponds to a second numerical example (FIGS. 11 to 18) which will be described later.

In the same manner as the antireflection film C1 of the first embodiment described above, the antireflection film C2 is a multilayer film which is disposed on the surface 100S of the optical substrate 100, and which consists of ten layers in total, that is, first to tenth layers 1 to 10 that are stacked sequentially from the opposite side to the optical substrate 100. In the following description of the antireflection film C2, components which are substantially different from those of the antireflection film C1 of the first embodiment will be mainly described, and descriptions of the same components will be accordingly omitted.

Preferably, the optical substrate 100 is made of a transparent material which exhibits a refractive index of 1.43 to 1.62 with respect to the d-line. Specifically, it is configured by $CaF_2$, $SiO_2$, BK7, LF1, F-3 (SCHOTT AG, Germany), or the like.

The first layer 1, the fourth layer 4, and the ninth layer 9 are low-refractive index layers made of a low-refractive index material exhibiting a refractive index of 1.35 to 1.50 with respect to the d-line. Preferably, the first layer 1 and the fourth layer 4 are particularly made of a low-refractive index material exhibiting a refractive index of 1.38 to 1.39 with respect to the d-line, and the ninth layer 9 is particularly made of a low-refractive index material exhibiting a refractive index of 1.46 to 1.47 with respect to the d-line. The third layer 3, the fifth layer 5, and the seventh layer 7 are intermediate-refractive index layers made of an intermediate-refractive index material exhibiting a refractive index of 1.55 to 1.85, particularly, from 1.62 to 1.63 with respect to the d-line. The second layer 2, the sixth layer 6, the eighth layer 8, and the tenth layer 10 are high-refractive index layers made of a high-refractive index material exhibiting a refractive index that is in a range from 1.70 to 2.50, particularly, from 1.80 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh to tenth layers 7 to 10 are configured so as to satisfy all of the following conditional expressions (11) to (14).

$$0.03 \times \lambda 0 \leq N7 \cdot d7 \leq 0.04 \times \lambda 0 \quad (11)$$

$$0.06 \times \lambda 0 \leq N8 \cdot d8 \leq 0.11 \times \lambda 0 \quad (12)$$

$$0.08 \times \lambda 0 \leq N9 \cdot d9 \leq 0.14 \times \lambda 0 \quad (13)$$

$$0.04 \times \lambda 0 \leq N10 \cdot d10 \leq 0.10 \times \lambda 0 \quad (14)$$

In the antireflection film C2 of the embodiment, as described above, the first to tenth layers 1 to 10 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6) and (11) to (14), whereby the above-mentioned effects can be further enhanced. Therefore, the same effects as those of the antireflection film C1 can be attained.

Third Embodiment

Figure 3:
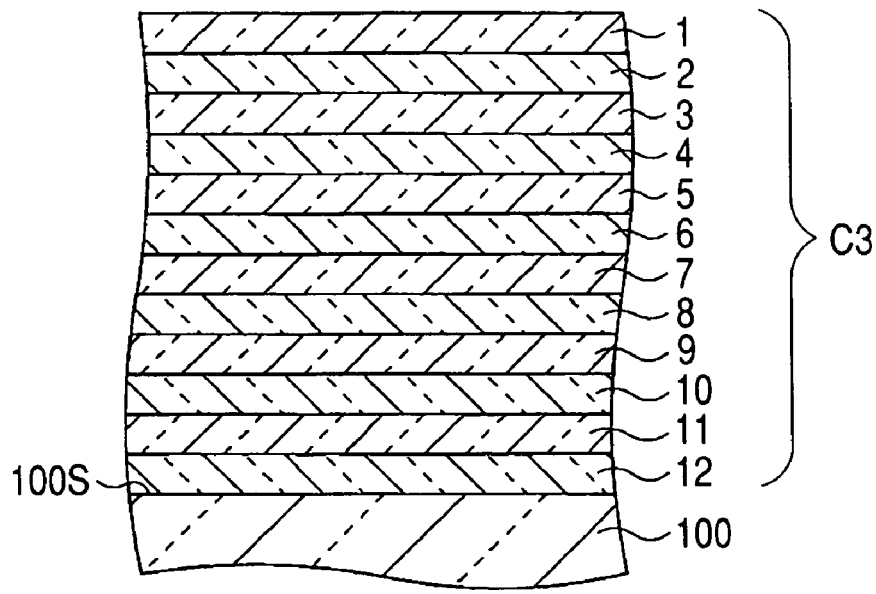
FIG. 3 is a section view of an antireflection film according to a third embodiment of the invention.

FIG. 3 is a schematic section view showing the configuration of an antireflection film C3 according to a third embodiment of the invention. The antireflection film C3 of FIG. 3 corresponds to a third numerical example (FIGS. 19 and 20) which will be described later.

The antireflection film C3 is a multilayer film which is disposed on the surface 100S of the optical substrate 100, and which consists of twelve layers in total, that is, first to twelfth layer 1 to 12 that are stacked sequentially from the opposite side to the optical substrate 100. In the following description of the antireflection film C3, components which are substantially different from those of the antireflection films C1, C2 of the first and second embodiments will be mainly described, and descriptions of the same components will be accordingly omitted.

Preferably, the optical substrate 100 is made of a transparent material which exhibits a refractive index of 1.61 to 1.67 with respect to the d-line. Specifically, it is configured by F-3, BASF-2 (SCHOTT AG, Germany), or the like.

The first layer 1, the fourth layer 4, the ninth layer 9, and the eleventh layer 11 are low-refractive index layers made of a low-refractive index material exhibiting a refractive index of 1.35 to 1.50 with respect to the d-line. Preferably, the first layer 1 and the fourth layer 4 are particularly made of a low-refractive index material exhibiting a refractive index of 1.38 to 1.39 with respect to the d-line, and the ninth layer 9 and the eleventh layer 11 are particularly made of a low-refractive index material exhibiting a refractive index of 1.46 to 1.47 with respect -to the d-line. The third layer 3, the fifth layer 5, and the seventh layer 7 are intermediate-refractive index layers made of an intermediate-refractive index material exhibiting a refractive index of 1.55 to 1.85, particularly, from 1.62 to 1.63 with respect to the d-line. The second layer 2, the sixth layer 6, the eighth layer 8, the tenth layer 10, and the twelfth layer 12 are high-refractive index layers made of a high-refractive index material exhibiting a refractive index that is in a range from 1.70 to 2.50, particularly, from 2.09 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh to twelfth layers 7 to 12 are configured so as to satisfy all of the following conditional expressions (15) to (20). In the expressions, N7 to N12 are the refractive indices of the seventh to twelfth layers 7 to 12 with respect to the center wavelength λ0, and d7 to d12 are the physical thicknesses of the seventh to twelfth layers 7 to 12.

$$0.03 \times \lambda 0 \leq N7 \cdot d7 \leq 0.04 \times \lambda 0 \quad (15)$$

$$0.10 \times \lambda 0 \leq N8 \cdot d8 \leq 0.12 \times \lambda 0 \quad (16)$$

$$0.10 \times \lambda 0 \leq N9 \cdot d9 \leq 0.11 \times \lambda 0 \quad (17)$$

$$0.10 \times \lambda 0 \leq N10 \cdot d10 \leq 0.11 \times \lambda 0 \quad (18)$$

$$0.13 \times \lambda 0 \leq N11 \cdot d11 \leq 0.16 \times \lambda 0 \quad (19)$$

$$0.04 \times \lambda 0 \leq N12 \cdot d12 \leq 0.05 \times \lambda 0 \quad (20)$$

In the antireflection film C3 of the embodiment, as described above, the first to twelfth layers 1 to 12 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6) and (15) to (20), whereby the above-mentioned effects can be further enhanced. Therefore, the same effects as those of the antireflection film C1 can be attained.

Fourth Embodiment

Figure 4:
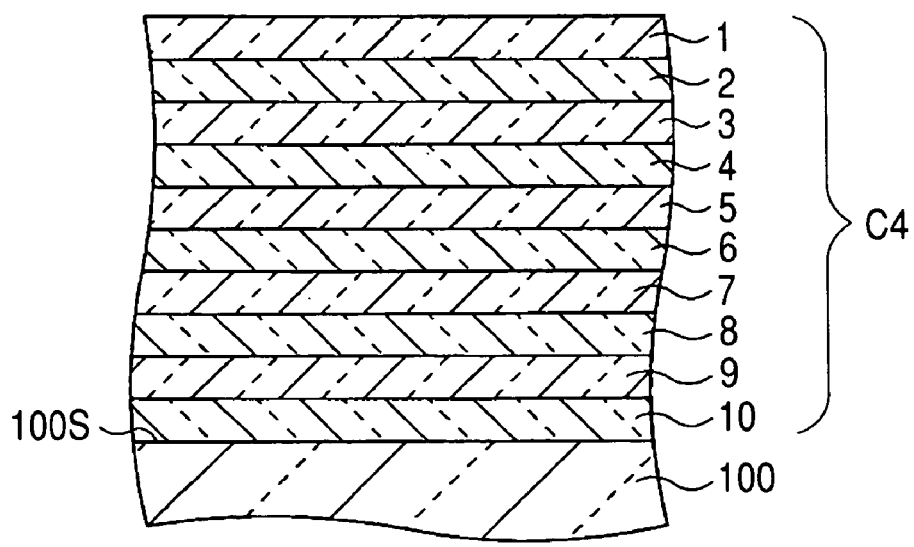
FIG. 4 is a section view of an antireflection film according to a fourth embodiment of the invention.

FIG. 4 is a schematic section view showing the configuration of an antireflection film C4 according to a fourth embodiment of the invention. The antireflection film C4 of FIG. 4 corresponds to a fourth numerical example (FIGS. 21 to 24) which will be described later.

The antireflection film C4 is a multilayer film which is disposed on the surface 100S of the optical substrate 100, and which consists of ten layers in total, that is, first to tenth layer 1 to 10 that are stacked sequentially from the opposite side to the optical substrate 100. In the following description of the antireflection film C4, components which are substantially different from those of the antireflection films C1 to C3 of the first to third embodiments will be mainly described, and descriptions of the same components will be accordingly omitted.

Preferably, the optical substrate 100 is made of a transparent material which exhibits a refractive index of 1.71 to 2.01 with respect to the d-line. Specifically, it is configured by SF-1, SF-2 (SCHOTT AG, Germany), S-LAH79 (OHARA INC.) or the like.

The first layer 1 and the fourth layer 4 are low-refractive index layers made of a low-refractive index material exhibiting a refractive index of 1.35 to 1.50, particularly, from 1.38 to 1.39 with respect to the d-line. The third layer 3, the fifth layer 5, the seventh layer 7, and the ninth layer 9 are intermediate-refractive index layers made of an intermediate-refractive index material exhibiting a refractive index of 1.55 to 1.85, particularly, from 1.62 to 1.63 with respect to the d-line. The second layer 2, the sixth layer 6, the eighth layer 8, and the tenth layer 10 are high-refractive index layers made of a high-refractive index material exhibiting a refractive index that is in a range from 1.70 to 2.50, particularly, from 2.09 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh to tenth layers 7 to 10 are configured so as to satisfy all of the following conditional expressions (21) to (24).

$$0.08 \times \lambda 0 \leq N7 \cdot d7 \leq 0.12 \times \lambda 0 \quad (21)$$

$$0.11 \times \lambda 0 \leq N8 \cdot d8 \leq 0.17 \times \lambda 0 \quad (22)$$

$$0.07 \times \lambda 0 \leq N9 \cdot d9 \leq 0.18 \times \lambda 0 \quad (23)$$

$$0.04 \times \lambda 0 \leq N10 \cdot d10 \leq 0.09 \times \lambda 0 \quad (24)$$

In the antireflection film C4 of the embodiment, as described above, the first to tenth layers 1 to 10 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6) and (21) to (24), whereby the above-mentioned effects can be further enhanced. Therefore, the same effects as those of the antireflection film C1 can be attained.

Fifth Embodiment

Figure 5:
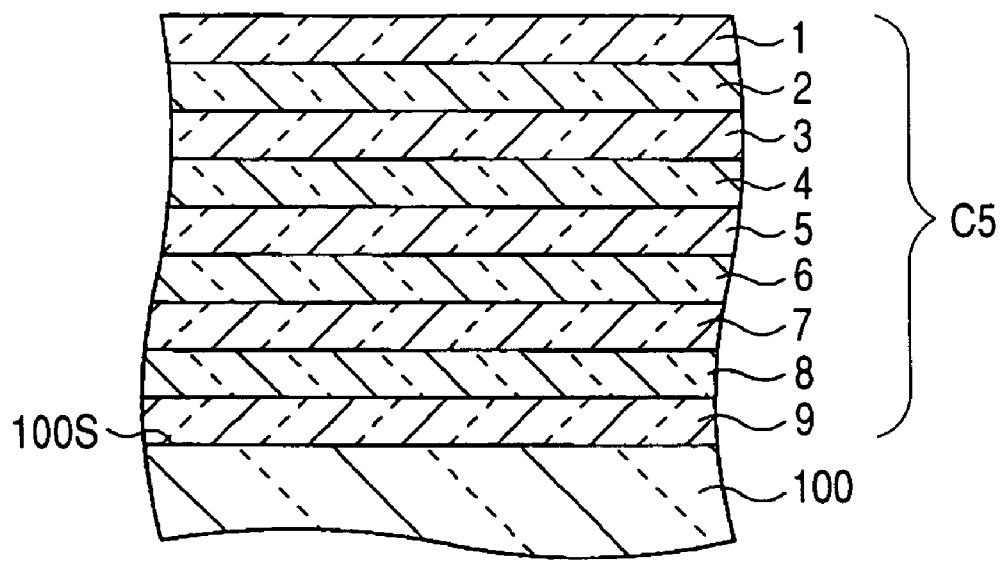
FIG. 5 is a section view of an antireflection film according to a fifth embodiment of the invention.

FIG. 5 is a schematic section view showing the configuration of an antireflection film C5 according to a fifth embodiment of the invention. The antireflection film C5 of FIG. 5 corresponds to a fifth numerical example (FIGS. 25 to 32) which will be described later.

The antireflection film C5 is a multilayer film which is disposed on the surface 100S of the optical substrate 100, and which consists of nine layers in total, that is, first to ninth layer 1 to 9 that are stacked sequentially from the opposite side to the optical substrate 100. In the following description of the antireflection film C5, components which are substantially different from those of the antireflection films C1 to C4 of the first to fourth embodiments will be mainly described, and descriptions of the same components will be accordingly omitted.

Preferably, the optical substrate 100 is made of a transparent material which exhibits a refractive index of 1.71 to 1.89 with respect to the d-line. Specifically, it is configured by SF1, SF14, SF6 (SCHOTT AG, Germany), LASF-N17 (OHARA INC.), NBFD13 (HOYA CORP.), or the like.

The first layer 1 and the fourth layer 4 are low-refractive index layers made of a low-refractive index material exhibiting a refractive index of 1.35 to 1.50, particularly, from 1.38 to 1.39 with respect to the d-line. The third layer 3, the fifth layer 5, the seventh layer 7, and the ninth layer 9 are intermediate-refractive index layers made of an intermediate-refractive index material exhibiting a refractive index of 1.55 to 1.85, particularly, from 1.62 to 1.63 with respect to the d-line. The second layer 2, the sixth layer 6, and the eighth layer 8 are high-refractive index layers made of a high-refractive index material exhibiting a refractive index that is in a range from 1.70 to 2.50, particularly, from 2.09 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh to ninth layers 7 to 9 are configured so as to satisfy all of the following conditional expressions (25) to (27).

$$0.08 \times \lambda 0 \leq N7 \cdot d7 \leq 0.12 \times \lambda 0 \quad (25)$$

$$0.07 \times \lambda 0 \leq N8 \cdot d8 \leq 0.155 \times \lambda 0 \quad (26)$$

$$0.06 \times \lambda 0 \leq N9 \cdot d9 \leq 0.12 \times \lambda 0 \quad (27)$$

In the antireflection film C5 of the embodiment, as described above, the first to ninth layers 1 to 9 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6) and (25) to (27), whereby the above-mentioned effects can be further enhanced. Therefore, the same effects as those of the antireflection film C1 can be attained.

Sixth Embodiment

Figure 6:
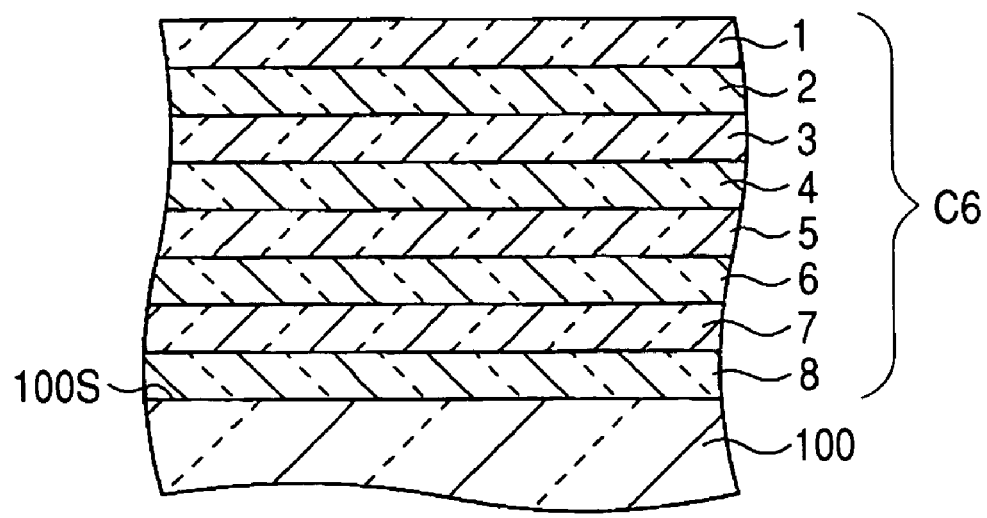
FIG. 6 is a section view of an antireflection film according to a sixth embodiment of the invention.

FIG. 6 is a schematic section view showing the configuration of an antireflection film C6 according to a sixth embodiment of the invention. The antireflection film C6 of FIG. 6 corresponds to a sixth numerical example (FIGS. 33 to 35) which will be described later.

The antireflection film C6 is a multilayer film which is disposed on the surface 100S of the optical substrate 100, and which consists of eight layers in total, that is, first to eighth layer 1 to 8 that are stacked sequentially from the opposite side to the optical substrate 100. In the following description of the antireflection film C6, components which are substantially different from those of the antireflection films C1 to C5 of the first to fifth embodiments will be mainly described, and descriptions of the same components will be accordingly omitted.

Preferably, the optical substrate 100 is made of a transparent material which exhibits a refractive index of 1.66 to 1.77 with respect to the d-line. Specifically, it is configured by BASF-2, SF1, SF14 (SCHOTT AG, Germany), or the like.

The first layer 1 and the fourth layer 4 are low-refractive index layers made of a low-refractive index material exhibiting a refractive index of 1.35 to 1.50, particularly, from 1.38 to 1.39 with respect to the d-line. The third layer 3, the fifth layer 5, and the seventh layer 7 are intermediate-refractive index layers made of an intermediate-refractive index material exhibiting a refractive index of 1.55 to 1.85, particularly, from 1.62 to 1.63 with respect to the d-line. The second layer 2, the sixth layer 6, and the eighth layer 8 are high-refractive index layers made of a high-refractive index material exhibiting a refractive index that is in a range from 1.70 to 2.50, particularly, from 2.09 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh and eighth layers 7 and 8 are configured so as to satisfy both of the following conditional expressions (28) and (29).

$$0.08 \times \lambda 0 \leq N7 \cdot d7 \leq 0.11 \times \lambda 0 \quad (28)$$

$$0.05 \times \lambda 0 \leq N8 \cdot d8 \leq 0.07 \times \lambda 0 \quad (29)$$

In the antireflection film C6 of the embodiment, as described above, the first to eighth layers 1 to 8 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6), (28), and (29), whereby the above-mentioned effects can be further enhanced. Therefore, the same effects as those of the antireflection film C1 can be attained.

Seventh Embodiment

Figure 7:
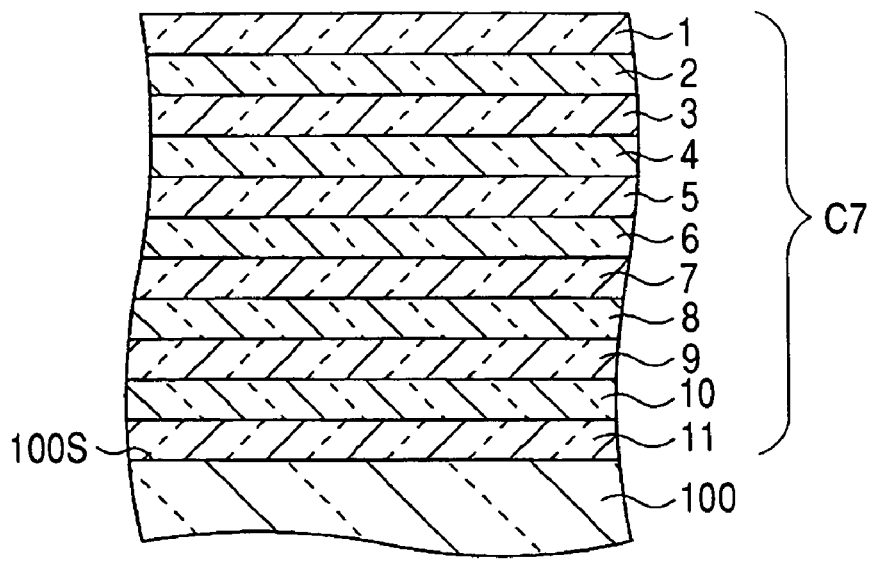
FIG. 7 is a section view of an antireflection film according to a seventh embodiment of the invention.

FIG. 7 is a schematic section view showing the configuration of an antireflection film C7 according to a seventh embodiment of the invention. The antireflection film C7 of FIG. 7 corresponds to a seventh numerical example (FIGS. 36 to 38) which will be described later.

The antireflection film C7 is a multilayer film which is disposed on the surface 100S of the optical substrate 100, and which consists of eleven layers in total, that is, first to eleventh layer 1 to 11 that are stacked sequentially from the opposite side to the optical substrate 100. In the following description of the antireflection film C7, components which are substantially different from those of the antireflection films C1 to C6 of the first to sixth embodiments will be mainly described, and descriptions of the same components will be accordingly omitted.

Preferably, the optical substrate 100 is made of a transparent material which exhibits a refractive index of 1.61 to 1.72 with respect to the d-line. Specifically, it is configured by F-3, BASF-2, SF1 (SCHOTT AG, Germany), or the like.

The first layer 1, the fourth layer 4, and the ninth layer 9 are low-refractive index layers made of a low-refractive index material exhibiting a refractive index of 1.35 to 1.50. Preferably, the first layer 1 and the fourth layer 4 are particularly made of a low-refractive index material exhibiting a refractive index of 1.38 to 1.39 with respect to the d-line, and the ninth layer 9 is particularly made of a low-refractive index material exhibiting a refractive index of 1.46 to 1.47 with respect to the d-line. The third layer 3, the fifth layer 5, the seventh layer 7, and the eleventh layer 11 are intermediate-refractive index layers made of an intermediate-refractive index material exhibiting a refractive index of 1.55 to 1.85, particularly, from 1.62 to 1.63 with respect to the d-line. The second layer 2, the sixth layer 6, the eighth layer 8, and the tenth layer 10 are high-refractive index layers made of a high-refractive index material exhibiting a refractive index that is in a range from 1.70 to 2.50, particularly, from 2.09 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh to eleventh layers 7 to 11 are configured so as to satisfy all of the following conditional expressions (30) to (34).

$$0.04 \times \lambda 0 \leq N7 \cdot d7 \leq 0.05 \times \lambda 0 \quad (30)$$

$$0.06 \times \lambda 0 \leq N8 \cdot d8 \leq 0.12 \times \lambda 0 \quad (31)$$

$$0.07 \times \lambda 0 \leq N9 \cdot d9 \leq 0.12 \times \lambda 0 \quad (32)$$

$$0.05 \times \lambda 0 \leq N10 \cdot d10 \leq 0.06 \times \lambda 0 \quad (33)$$

$$0.04 \times \lambda 0 \leq N11 \cdot d11 \leq 0.26 \times \lambda 0 \quad (34)$$

In the antireflection film C7 of the embodiment, as described above, the first to eleventh layers 1 to 11 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6), and (30) to (34), whereby the above-mentioned effects can be further enhanced. Therefore, the same effects as those of the antireflection film C1 can be attained.

Eighth Embodiment

Figure 8:
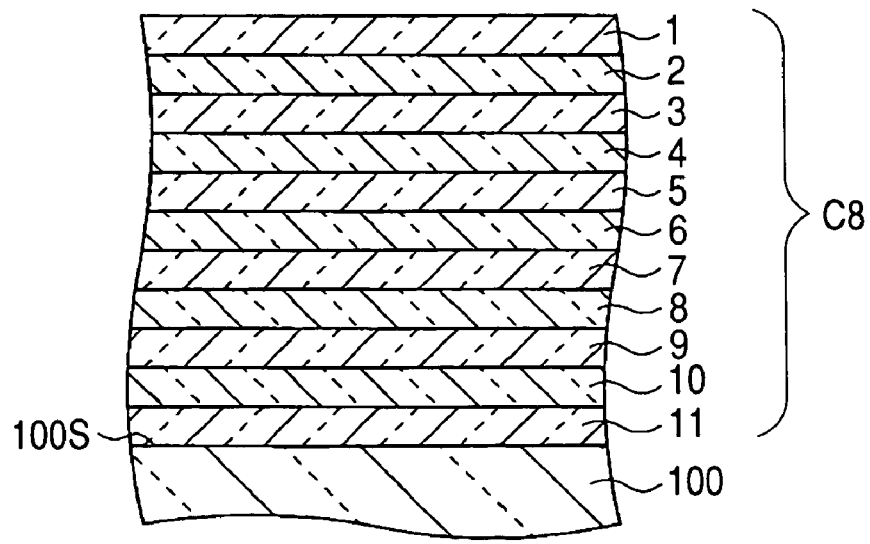
FIG. 8 is a section view of an antireflection film according to an eighth embodiment of the invention.

FIG. 8 is a schematic section view showing the configuration of an antireflection film C8 according to an eighth embodiment of the invention. The antireflection film C8 of FIG. 8 corresponds to an eighth numerical example (FIGS. 39 and 40) which will be described later.

In the same manner as the antireflection film C7 of the seventh embodiment, the antireflection film C8 is a multilayer film which is disposed on the surface 100S of the optical substrate 100, and which consists of eleven layers in total, that is, first to eleventh layer 1 to 11 that are stacked sequentially from the opposite side to the optical substrate 100. In the following description of the antireflection film C8, components which are substantially different from those of the antireflection film C7 will be mainly described, and descriptions of the same components will be accordingly omitted.

Preferably, the optical substrate 100 is made of a transparent material which exhibits a refractive index of 1.61 to 1.67 with respect to the d-line. Specifically, it is configured by F-3, BASF-2 (SCHOTT AG, Germany), or the like.

The first layer 1, the fourth layer 4, the ninth layer 9, and the eleventh layer 11 are low-refractive index layers made of a low-refractive index material exhibiting a refractive index of 1.35 to 1.50. Preferably, the first layer 1 and the fourth layer 4 are particularly made of a low-refractive index material exhibiting a refractive index of 1.38 to 1.39 with respect to the d-line, and the ninth layer 9 and the eleventh layer 11 are particularly made of a low-refractive index material exhibiting a refractive index of 1.46 to 1.47 with respect to the d-line. The third layer 3, the fifth layer 5, and the seventh layer 7 are intermediate-refractive index layers made of an intermediate-refractive index material exhibiting a refractive index of 1.55 to 1.85, particularly, from 1.62 to 1.63 with respect to the d-line. The second layer 2, the sixth layer 6, the eighth layer 8, and the tenth layer 10 are high-refractive index layers made of a high-refractive index material exhibiting a refractive index that is in a range from 1.70 to 2.50, particularly, from 2.09 to 2.10 with respect to the d-line, and that is higher than the refractive index of the intermediate-refractive index material.

Preferably, the first to sixth layers 1 to 6 are configured so as to satisfy all of the conditional expressions (1) to (6) above.

Preferably, the seventh to eleventh layers 7 to 11 are configured so as to satisfy all of the following conditional expressions (35) to (39).

$$0.03 \times \lambda 0 \leq N7 \cdot d7 \leq 0.04 \times \lambda 0 \quad (35)$$

$$0.10 \times \lambda 0 \leq N8 \cdot d8 \leq 0.12 \times \lambda 0 \quad (36)$$

$$0.11 \times \lambda 0 \leq N9 \cdot d9 \leq 0.12 \times \lambda 0 \quad (37)$$

$$0.07 \times \lambda 0 \leq N10 \cdot d10 \leq 0.09 \times \lambda 0 \quad (38)$$

$$0.08 \times \lambda 0 \leq N11 \cdot d11 \leq 0.09 \times \lambda 0 \quad (39)$$

In the antireflection film C8 of the embodiment, as described above, the first to eleventh layers 1 to 11 which exhibit refractive indices in the predetermined ranges, respectively are stacked sequentially starting at the side (i.e., the air side) opposite to the optical substrate 100. Although the number of stacked layers is relatively small, therefore, the reflectivity can be sufficiently reduced in a broader wavelength band. Specifically, the reflectivity can be suppressed to 0.15% or less in a wavelength band of at least 300 nm width. The optical thickness N·d is optimized by satisfying conditional expressions (1) to (6), and (35) to (39), whereby the above-mentioned effects can be further enhanced. Therefore, the same effects as those of the antireflection film C1 can be attained.

EXAMPLES

Next, specific numerical examples of an antireflection film according to the embodiments will be described.

First Numerical Example

FIGS. 9 and 10 show the first numerical example (Examples 1-1 and 1-2). FIGS. 9(A) and 10(A) show basic data of Examples 1-1 and 1-2 corresponding to the antireflection film C1 shown in FIG. 1, respectively. FIGS. 9(B) and 10(B) show reflectivity distributions of Examples 1-1 and 1-2, respectively.

In FIGS. 9(A) and 10(A), the constituent material, refractive index N with respect to the d-line, physical thickness d (unit: nm), and optical thickness (unit: nm) of each layer are shown. The term "sub-h4" in the column of the constituent material indicates Substance H4 (Merck KGaA, Germany) which consists primarily of $LaTiO_3$. All the center wavelengths λ0 indicated in the column of the optical thickness N·d are 480 nm. As seen from the figures, the refractive indices N and optical thicknesses N·d of the layers satisfy all of conditional expressions (1) to (10). By contrast, FIGS. 9(B) and 10(B) in which the ordinate indicates the reflectivity (%) and the abscissa indicates the wavelength λ (nm) at measurement show the wavelength dependence of the reflectivity (%) in each embodiment. As seen from the figures, the reflectivities in the wavelength band of about 400 to 700 nm stay within a range from 0.05 to 0.15%.

Second Numerical Example

FIGS. 11 to 18 show the second numerical example (Examples 2-1 to 2-8).

FIGS. 11(A), 12(A), 13(A), 14(A), 15(A), 16(A), 17(A), and 18(A) show basic data of Examples 2-1 to 2-8 corresponding to the antireflection film C2 shown in FIG. 2, respectively. All the center wavelengths λ0 indicated in the column of the optical thickness N·d are 480 nm. In Examples 2-1 to 2-3, the tenth layer which is closest to the substrate is configured by $Y_2O_3$, and, in Examples 2-4 to 2-8, configured by Substance H4 (Merck KGaA, Germany). As seen from the figures, the refractive indices N and optical thicknesses N·d of the layers satisfy all of conditional expressions (1) to (6) and (11) to (14).

On the other hand, FIGS. 11(B), 12(B), 13(B), 14(B), 15(B), 16(B), 17(B), and 18(B) show reflectivity distributions of Examples 2-1 to 2-8, respectively. As seen from the figures, the reflectivities in the wavelength band of about 400 to 700 nm stay within a range from 0.05 to 0.15%.

Third Numerical Example

FIGS. 19 and 20 show the numerical example (Examples 3-1 and 3-2) corresponding to the antireflection film C3 shown in FIG. 3.

FIGS. 19(A) and 20(A) show basic data of Examples 3-1 and 3-2, respectively. All the center wavelengths λ0 indicated in the column of the optical thickness N·d are 480 nm. As seen from the figures, the refractive indices N and optical thicknesses N·d of the layers satisfy all of conditional expressions (1) to (6) and (15) to (20).

On the other hand, FIGS. 19(B) and 20(B) show reflectivity distributions of Examples 3-1 and 3-2, respectively. As seen from the figures, the reflectivities in the wavelength band of about 400 to 700 nm stay within a range from 0.05 to 0.15%.

Fourth Numerical Example

FIGS. 21 to 24 show the fourth numerical example (Examples 4-1 to 4-4).

FIGS. 21(A), 22(A), 23(A), and 24(A) show basic data of Examples 4-1 to 4-4 corresponding to the antireflection film C4 shown in FIG. 4, respectively. In Examples 4-1 to 4-3, the center wavelengths λ0 indicated in the column of the optical thickness N·d are 480 nm, and, in Example 4-4, the center wavelength is 690 nm. As seen from the figures, the refractive indices N and optical thicknesses N·d of the layers satisfy all of conditional expressions (1) to (6) and (21) to (24).

On the other hand, FIGS. 21(B), 22(B), 23(B), and 24(B) show reflectivity distributions of Examples 4-1 to 4-4, respectively. As seen from the figures, in the Examples 4-1 to 4-3, the reflectivities in the wavelength band of about 400 to 700 nm are approximately 0.15% or less; and in the Example 4-4, the reflectivities in the wavelength band of about 550 to 1,000 nm are approximately 0.15% or less.

Fifth Numerical Example

FIGS. 25 to 32 show the fifth numerical example (Examples 5-1 to 5-8).

FIGS. 25(A), 26(A), 27(A), 28(A), 29(A), 30(A), 31(A), and 32(A) show basic data of Examples 5-1 to 5-8 corresponding to the antireflection film C5 shown in FIG. 5, respectively.

In Examples 5-1 to 5-6, the center wavelengths λ0 indicated in the column of the optical thickness N·d are 480 nm, and, in Examples 5-7 and 5-8, the center wavelengths are 690 nm.

As seen from the figures, the refractive indices N and optical thicknesses N·d of the layers satisfy all of conditional expressions (1) to (6) and (25) to (27).

On the other hand, FIGS. 25(B), 26(B), 27(B), 28(B), 29(B), 30(B), 31(B), and 32(B) show reflectivity distributions of Examples 5-1 to 5-8, respectively. As seen from the figures, in Examples 5-1 to 5-6, the reflectivities in the wavelength band of about 400 to 700 nm are approximately 0.15% or less, and in Examples 5-7 and 5-8, the reflectivities in the wavelength band of about 550 to 1,000 nm stay within a range from 0.05 to 0.15%.

Sixth Numerical Example

FIGS. 33 to 35 show the sixth numerical example (Examples 6-1 to 6-3).

FIGS. 33(A), 34(A), and 35(A) show basic data of Examples 6-1 to 6-3 corresponding to the antireflection film C6 shown in FIG. 6, respectively. All the center wavelengths λ0 indicated in the column of the optical thickness N·d are 480 nm. As seen from the figures, the refractive indices N and optical thicknesses N·d of the layers satisfy all of conditional expressions (1) to (6), (28), and (29).

On the other hand, FIGS. 33(B), 34(B), and 35(B) show reflectivity distributions of Examples 6-1 to 6-3, respectively. As seen from the figures, the reflectivities in the wavelength band of about 400 to 700 nm are 0.15% or less.

Seventh Numerical Example

FIGS. 36 to 38 show the seventh numerical example (Examples 7-1 to 7-3).

FIGS. 36(A), 37(A), and 38(A) show basic data of Examples 7-1 to 7-3 corresponding to the antireflection film C7 shown in FIG. 7, respectively. All the center wavelengths λ0 indicated in the column of the optical thickness N·d are 480 nm. As seen from the figures, the refractive indices N and optical thicknesses N·d of the layers satisfy all of conditional expressions (1) to (6), and (30) to (34).

On the other hand, FIGS. 36(B), 37(B), and 38(B) show reflectivity distributions of Examples 7-1 to 7-3, respectively. As seen from the figures, the reflectivities in the wavelength band of about 400 to 700 nm are 0.15% or less.

Eighth Numerical Example

FIGS. 39 and 40 show the eighth numerical example (Examples 8-1 and 8-2).

FIGS. 39(A) and 40(A) show basic data of Examples 8-1 and 8-2 corresponding to the antireflection film C8 shown in FIG. 8, respectively. All the center wavelengths λ0 indicated in the column of the optical thickness N·d are 480 nm. As seen from the figures, the refractive indices N and optical thicknesses N·d of the layers satisfy all of conditional expressions (1) to (6), and (35) to (39).

On the other hand, FIGS. 39(B) and 40(B) show reflectivity distributions of Examples 8-1 and 8-2, respectively. As seen from the figures, the reflectivities in the wavelength band of about 400 to 700 nm are 0.15% or less.

As apparent from the basic data and the reflectivity distribution diagrams, the embodiments exert a very excellent reflectivity distribution. Namely, it was confirmed that the antireflection film of the invention can sufficiently reduce the reflectivity in a predetermined wavelength band, and satisfactorily flatten the distribution of the reflectivity.

While the invention has been described with reference to the embodiments and the examples, the invention is not limited to the embodiments and the examples, and may be variously modified. For example, the reflectivities and optical thicknesses of the layers and substrates are not limited to the values shown in the numerical examples, and may have various values. The kinds of the materials constituting the layers and the substrates are not limited to those shown in the numerical examples, and other kinds of materials may be used.

Furthermore, each layer may be configured by plural films on the basis of the equivalent film theory. Namely, two kinds of refractive index films are symmetrically stacked, so that they optically behave as a single layer.

What is claimed is:

1. An antireflection film disposed on a substrate, the antireflection film comprising:
    first to eighth layers that are stacked sequentially from an opposite side to the substrate, wherein:
    the first and fourth layers are made of a low-refractive index material exhibiting a refractive index of 1.35 to 1.50 with respect to the d-line,
    the third and fifth layers are made of an intermediate-refractive index material exhibiting a refractive index of 1.55 to 1.85 with respect to the d-line, and
    the second and sixth layers are made of a high-refractive index material exhibiting a refractive index that is in a range from 1.70 to 2.50 with respect to the d-line, and that is higher than the refractive index of the intermediate-refractive index material;
    wherein the antireflection film satisfies following conditional expressions (1) to (6):

$$0.25 \times \lambda 0 \leq N1 \cdot d1 \leq 0.27 \times \lambda 0 \quad (1)$$

$$0.48 \times \lambda 0 \leq N2 \cdot d2 \leq 0.50 \times \lambda 0 \quad (2)$$

$$0.20 \times \lambda 0 \leq N3 \cdot d3 \leq 0.23 \times \lambda 0 \quad (3)$$

$$0.08 \times \lambda 0 \leq N4 \cdot d4 \leq 0.09 \times \lambda 0 \quad (4)$$

$$0.27 \times \lambda 0 \leq N5 \cdot d5 \leq 0.30 \times \lambda 0 \quad (5)$$

$$0.41 \times \lambda 0 \leq N6 \cdot d6 \leq 0.60 \times \lambda 0 \quad (6)$$

where
    λ0: center wavelength,
    N1 to N6: refractive indices of the first to sixth layers with respect to the center wavelength λ0, and
    d1 to d6: physical thicknesses of the first to sixth layers.

2. The antireflection film according to claim 1, wherein:
    the seventh layer is made of the intermediate-refractive index material, and
    the eighth layer is made of the high-refractive index material.

3. The antireflection film according to claim 2, wherein the antireflection film further satisfies following conditional expressions (7) and (8):

$$0.03 \times \lambda 0 \leq N7 \cdot d7 \leq 0.13 \times \lambda 0 \quad (7)$$

$$0.05 \times \lambda 0 \leq N8 \cdot d8 \leq 0.11 \times \lambda 0 \quad (8)$$

where
    λ0: center wavelength,
    N7 and N8: refractive indices of the seventh and eighth layers with respect to the center wavelength λ0, and
    d7 and d8: physical thicknesses of the seventh and eighth layers.

4. The antireflection film according to claim 3, further comprising:
    ninth and tenth layers, which are stacked sequentially on a substrate side of the eighth layer, wherein:
    the ninth layer is made of the low-refractive index material, and
    the tenth layer is made of the intermediate-refractive index material.

5. The antireflection film according to claim 4, wherein the antireflection film further satisfies following conditional expressions (9) and (10):

$$0.08 \times \lambda 0 \leq N9 \cdot d9 \leq 0.09 \times \lambda 0 \quad (9)$$

$$0.09 \times \lambda 0 \leq N10 \cdot d10 \leq 0.14 \times \lambda 0 \quad (10)$$

where
    λ0: center wavelength,
    N9 and N10: refractive indices of the ninth and tenth layers with respect to the center wavelength λ0, and
    d9 and d10: physical thicknesses of the ninth and tenth layers.

6. The antireflection film according to claim 5, wherein the substrate exhibits a refractive index of 1.43 to 1.58 with respect to the d-line.

7. The antireflection film according to claim 2, wherein the antireflection film further satisfies following conditional expressions (11) and (12):

$$0.03 \times \lambda 0 \leq N7 \cdot d7 \leq 0.04 \times \lambda 0 \quad (11)$$

$$0.06 \times \lambda 0 \leq N8 \cdot d8 \leq 0.11 \times \lambda 0 \quad (12)$$

where
λ0: center wavelength,
N7 and N8: refractive indices of the seventh and eighth layers with respect to the center wavelength λ0, and
d7 and d8: physical thicknesses of the seventh and eighth layers.

8. The antireflection film according to claim 7, further comprising:
ninth and tenth layers, which are stacked sequentially on a substrate side of the eighth layer, wherein:
the ninth layer is made of the low-refractive index material, and
the tenth layer is made of the high-refractive index material.

9. The antireflection film according to claim 8, wherein the antireflection film further satisfies following conditional expressions (13) and (14):

$$0.08 \times \lambda 0 \leq N9 \cdot d9 \leq 0.14 \times \lambda 0 \tag{13}$$

$$0.04 \times \lambda 0 \leq N10 \cdot d10 \leq 0.10 \times \lambda 0 \tag{14}$$

where
λ0: center wavelength,
N9 and N10: refractive indices of the ninth and tenth layers with respect to the center wavelength λ0, and
d9 and d10: physical thicknesses of the ninth and tenth layers.

10. The antireflection film according to claim 9, wherein the substrate exhibits a refractive index of 1.43 to 1.62 with respect to the d-line.

11. The antireflection film according to claim 2, wherein the antireflection film further satisfies following conditional expressions (15) and (16):

$$0.03 \times \lambda 0 \leq N7 \cdot d7 \leq 0.04 \times \lambda 0 \tag{15}$$

$$0.10 \times \lambda 0 \leq N8 \cdot d8 \leq 0.12 \times \lambda 0 \tag{16}$$

where
λ0: center wavelength,
N7 and N8: refractive indices of the seventh and eighth layers with respect to the center wavelength λ0, and
d7 and d8: physical thicknesses of the seventh and eighth layers.

12. The antireflection film according to claim 11, further comprising:
ninth and twelfth layers, which are stacked sequentially on a substrate side of the eighth layer, wherein:
the ninth layer is made of the low-refractive index material,
the tenth layer is made of the high-refractive index material,
the eleventh layer is made of the low-refractive index material, and
the twelfth layer is made of the high-refractive index material.

13. The antireflection film according to claim 12, wherein the antireflection film further satisfies following conditional expressions (17) to (20):

$$0.10 \times \lambda 0 \leq N9 \cdot d9 \leq 0.11 \times \lambda 0 \tag{17}$$

$$0.10 \times \lambda 0 \leq N10 \cdot d10 \leq 0.11 \times \lambda 0 \tag{18}$$

$$0.13 \times \lambda 0 \leq N11 \cdot d11 \leq 0.16 \times \lambda 0 \tag{19}$$

$$0.04 \times \lambda 0 \leq N12 \cdot d12 \leq 0.05 \times \lambda 0 \tag{20}$$

where
λ0: center wavelength,
N9 to N12: refractive indices of the ninth to twelfth layers with respect to the center wavelength λ0, and
d9 to d12: physical thicknesses of the ninth to twelfth layers.

14. The antireflection film according to claim 13, wherein the substrate exhibits a refractive index of 1.61 to 1.67 with respect to the d-line.

15. The antireflection film according to claim 2, wherein the antireflection film further satisfies following conditional expressions (21) and (22):

$$0.08 \times \lambda 0 \leq N7 \cdot d7 \leq 0.12 \times \lambda 0 \tag{21}$$

$$0.11 \times \lambda 0 \leq N8 \cdot d8 \leq 0.17 \times \lambda 0 \tag{22}$$

where
λ0: center wavelength,
N7 and N8: refractive indices of the seventh and eighth layers with respect to the center wavelength λ0, and
d7 and d8: physical thicknesses of the seventh and eighth layers.

16. The antireflection film according to claim 15, further comprising:
ninth and tenth layers, which are stacked sequentially on a substrate side of the eighth layer, wherein:
the ninth layer is made of the intermediate-refractive index material, and
the tenth layer is made of the high-refractive index material.

17. The antireflection film according to claim 16, wherein the antireflection film further satisfies following conditional expressions (23) and (24):

$$0.07 \times \lambda 0 \leq N9 \cdot d9 \leq 0.18 \times \lambda 0 \tag{23}$$

$$0.04 \times \lambda 0 \leq N10 \cdot d10 \leq 0.09 \times \lambda 0 \tag{24}$$

where
λ0: center wavelength,
N9 and N10: refractive indices of the ninth and tenth layers with respect to the center wavelength λ0, and
d9 and d10: physical thicknesses of the ninth and tenth layers.

18. The antireflection film according to claim 17, wherein the substrate exhibits a refractive index of 1.71 to 2.01 with respect to the d-line.

19. The antireflection film according to claim 2, wherein the antireflection film further satisfies following conditional expressions (25) and (26):

$$0.08 \times \lambda 0 \leq N7 \cdot d7 \leq 0.12 \times \lambda 0 \tag{25}$$

$$0.07 \times \lambda 0 \leq N8 \cdot d8 \leq 0.155 \times \lambda 0 \tag{26}$$

where
λ0: center wavelength,
N7 and N8: refractive indices of the seventh and eighth layers with respect to the center wavelength λ0, and
d7 and d8: physical thicknesses of the seventh and eighth layers.

20. The antireflection film according to claim 19, further comprising:
a ninth layer stacked on a substrate side of the eighth layer, wherein:
the ninth layer is made of the intermediate-refractive index material.

21. The antireflection film according to claim 20, wherein the antireflection film further satisfies a following conditional expression (27):

$$0.06 \times \lambda 0 \leq N9 \cdot d9 \leq 0.12 \times \lambda 0 \tag{27}$$

where
λ0: center wavelength,
N9: refractive index of the ninth layer with respect to the center wavelength λ0, and
d9: physical thickness of the ninth layer.

22. The antireflection film according to claim 21, wherein the substrate exhibits a refractive index of 1.71 to 1.89 with respect to the d-line.

23. The antireflection film according to claim 2, wherein:
the antireflection film consists only of the first to eighth layers, and
the antireflection film satisfies following conditional expressions (28) and (29):

$$0.08 \times \lambda 0 \leq N7 \cdot d7 \leq 0.11 \times \lambda 0 \tag{28}$$

$$0.05 \times \lambda 0 \leq N8 \cdot d8 \leq 0.07 \times \lambda 0 \tag{29}$$

where
λ0: center wavelength,
N7 and N8: refractive indices of the seventh and eighth layers with respect to the center wavelength λ0, and
d7 and d8: physical thicknesses of the seventh and eighth layers.

24. The antireflection film according to claim 23, wherein the substrate exhibits a refractive index of 1.66 to 1.77 with respect to the d-line.

25. The antireflection film according to claim 2, wherein the antireflection film further satisfies following conditional expressions (30) and (31):

$$0.04 \times \lambda 0 \leq N7 \cdot d7 \leq 0.05 \times \lambda 0 \tag{30}$$

$$0.06 \times \lambda 0 \leq N8 \cdot d8 \leq 0.12 \times \lambda 0 \tag{31}$$

where
λ0: center wavelength,
N7 and N8: refractive indices of the seventh and eighth layers with respect to the center wavelength λ0, and
d7 and d8: physical thicknesses of the seventh and eighth layers.

26. The antireflection film according to claim 25, further comprising:
ninth to eleventh layers, which are sequentially stacked on a substrate side of the eighth layer, wherein:
the ninth layer is made of the low-refractive index material,
the tenth layer is made of the high-refractive index material, and
the eleventh layer is made of the intermediate-refractive index material.

27. The antireflection film according to claim 26, wherein the antireflection film further satisfies following conditional expressions (32) to (34):

$$0.07 \times \lambda 0 \leq N9 \cdot d9 \leq 0.12 \times \lambda 0 \tag{32}$$

$$0.05 \times \lambda 0 \leq N10 \cdot d10 \leq 0.06 \times \lambda 0 \tag{33}$$

$$0.04 \times \lambda 0 \leq N11 \cdot d11 \leq 0.26 \times \lambda 0 \tag{34}$$

where
λ0: center wavelength,
N9 to N11: refractive indices of the ninth to eleventh layers with respect to the center wavelength λ0, and
d9 to d11: physical thicknesses of the ninth to eleventh layers.

28. The antireflection film according to claim 27, wherein the substrate exhibits a refractive index of 1.61 to 1.72 with respect to the d-line.

29. The antireflection film according to claim 2, wherein the antireflection film further satisfies following conditional expressions (35) and (36):

$$0.03 \times \lambda 0 \leq N7 \cdot d7 \leq 0.04 \times \lambda 0 \tag{35}$$

$$0.10 \times \lambda 0 \leq N8 \cdot d8 \leq 0.12 \times \lambda 0 \tag{36}$$

where
λ0: center wavelength,
N7 and N8: refractive indices of the seventh and eighth layers with respect to the center wavelength λ0, and
d7 and d8: physical thicknesses of the seventh and eighth layers.

30. The antireflection film according to claim 29, further comprising:
ninth to eleventh layers, which are subsequently stacked on a substrate side of the eighth layer, wherein:
the ninth layer is made of the low-refractive index material,
the tenth layer is made of the high-refractive index material, and
the eleventh layer is made of the low-refractive index material.

31. The antireflection film according to claim 30, wherein the antireflection film further satisfies of following conditional expressions (37) to (39):

$$0.11 \times \lambda 0 \leq N9 \cdot d9 \leq 0.12 \times \lambda 0 \tag{37}$$

$$0.07 \times \lambda 0 \leq N10 \cdot d10 \leq 0.09 \times \lambda 0 \tag{38}$$

$$0.08 \times \lambda 0 \leq N11 \cdot d11 \leq 0.09 \times \lambda 0 \tag{39}$$

where
λ0: center wavelength,
N9 to N11: refractive indices of the ninth to eleventh layers with respect to the center wavelength λ0, and
d9 to d11: physical thicknesses of the ninth to eleventh layers.

32. The antireflection film according to claim 31, wherein the substrate exhibits a refractive index of 1.61 to 1.67 with respect to the d-line.

33. The antireflection film according to claim 1, wherein:
the low-refractive index material contains at least one of magnesium fluoride ($MgF_2$), silicon dioxide ($SiO_2$), and aluminum fluoride ($AlF_3$),
the intermediate-refractive index material contains at least one of aluminum oxide ($Al_2O_3$), germanium oxide ($GeO_2$), and yttrium oxide ($Y_2O_3$), and
the high-refractive index material contains at least one of lanthanum titanate ($LaTiO_3$), zirconium oxide ($ZrO_2$), titanium oxide ($TiO_2$), tantalum oxide ($Ta_2O_5$), niobium oxide ($Nb_2O_5$), hafnium oxide ($HfO_2$), and cerium oxide ($CeO_2$).

* * * * *